US010936182B2

(12) United States Patent
Lee et al.

(10) Patent No.: US 10,936,182 B2
(45) Date of Patent: Mar. 2, 2021

(54) ELECTRONIC DEVICE, AND METHOD FOR PROVIDING SCREEN ACCORDING TO LOCATION OF ELECTRONIC DEVICE

(71) Applicant: Samsung Electronics Co., Ltd., Suwon-si (KR)

(72) Inventors: Yong Yeon Lee, Suwon-si (KR); Dong Goo Kang, Seoul (KR); Jin Ah Kong, Seoul (KR); Ji Yeon Kwak, Seoul (KR); Yun Kyung Kim, Suwon-si (KR); Hae Yoon Park, Seoul (KR); Yeo Jun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/767,214

(22) PCT Filed: Nov. 16, 2016

(86) PCT No.: PCT/KR2016/013168
§ 371 (c)(1),
(2) Date: Apr. 10, 2018

(87) PCT Pub. No.: WO2017/086681
PCT Pub. Date: May 26, 2017

(65) Prior Publication Data
US 2019/0073107 A1 Mar. 7, 2019

(30) Foreign Application Priority Data
Nov. 17, 2015 (KR) .................. 10-2015-0161004

(51) Int. Cl.
*G06F 3/0487* (2013.01)
*G06F 1/16* (2006.01)
(Continued)

(52) U.S. Cl.
CPC ....... *G06F 3/0487* (2013.01); *G04C 17/0091* (2013.01); *G04G 9/0064* (2013.01);
(Continued)

(58) Field of Classification Search
CPC ....... G04C 17/0091; G06F 1/16; G06F 1/163; G06F 3/0362; G06F 3/0412; G06F 3/0487
See application file for complete search history.

(56) References Cited

U.S. PATENT DOCUMENTS 7,583,508 B2   9/2009  Hagiwara et al.
8,279,716 B1   10/2012 Gossweiler, III et al.
(Continued)

FOREIGN PATENT DOCUMENTS

CN   101594427 A   12/2009
CN   101873455 A   10/2010
(Continued)

OTHER PUBLICATIONS

Chinese Office Action with English translation dated Oct. 12, 2020; Chinese Appln. No. 201680066987.4.

*Primary Examiner* — Afroza Chowdhury
(74) *Attorney, Agent, or Firm* — Jefferson IP Law, LLP

(57) ABSTRACT

An electronic device includes a display including a transparent area through which content is output and through which external light passes and a processor electrically connected to the display. The processor is configured to obtain information about an overlap location of an external device and the electronic device, to execute a function mapped to the information about the overlap location, and to output a screen associated with the function on the transparent area.

14 Claims, 24 Drawing Sheets

(51) Int. Cl.
  *G04C 17/00* (2006.01)
  *G06F 3/041* (2006.01)
  *G06F 3/0362* (2013.01)
  *G04G 9/00* (2006.01)
(52) U.S. Cl.
  CPC ............... *G06F 1/16* (2013.01); *G06F 1/163* (2013.01); *G06F 3/0362* (2013.01); *G06F 3/0412* (2013.01)

(56) References Cited

U.S. PATENT DOCUMENTS

| | | | |
|---|---|---|---|
| 8,379,488 B1 | 2/2013 | Gossweiler, III et al. | |
| 8,649,824 B2 | 2/2014 | Choi | |
| 8,823,663 B2 | 9/2014 | Ryu et al. | |
| 8,902,714 B2 | 12/2014 | Gossweiler, III et al. | |
| 8,941,683 B2 | 1/2015 | Son et al. | |
| 8,983,539 B1* | 3/2015 | Kim | G06F 3/1454 345/2.3 |
| 9,128,555 B2* | 9/2015 | Lee | G06F 1/1643 |
| 9,192,066 B2* | 11/2015 | Tani | H04M 1/0237 |
| 9,197,082 B1* | 11/2015 | Zhang | G16H 40/63 |
| 9,350,846 B2 | 5/2016 | Kim et al. | |
| 9,666,161 B2 | 5/2017 | Zeng et al. | |
| 9,679,128 B1* | 6/2017 | Leung | G06F 21/44 |
| 10,416,872 B2* | 9/2019 | Leppanen | G06F 3/0482 |
| 2004/0037051 A1 | 2/2004 | Hagiwara et al. | |
| 2009/0298537 A1 | 12/2009 | Choi | |
| 2010/0227642 A1* | 9/2010 | Kim | H04M 1/72577 455/556.1 |
| 2011/0187655 A1* | 8/2011 | Min | G06F 1/1643 345/173 |
| 2011/0199076 A1 | 8/2011 | Nagasawa | |
| 2011/0246894 A1* | 10/2011 | Luo | G06F 3/0488 715/733 |
| 2012/0102438 A1 | 4/2012 | Robinson et al. | |
| 2012/0105487 A1 | 5/2012 | Son et al. | |
| 2012/0256886 A1 | 10/2012 | Ryu et al. | |
| 2013/0155590 A1* | 6/2013 | Tani | H04M 1/0237 361/679.01 |
| 2013/0163390 A1 | 6/2013 | Gossweiler, III et al. | |
| 2014/0123038 A1 | 5/2014 | Ann et al. | |
| 2014/0347267 A1 | 11/2014 | Nishi et al. | |
| 2015/0126247 A1 | 5/2015 | Kim et al. | |
| 2015/0381793 A1* | 12/2015 | Cerda | H04M 1/72541 455/556.1 |
| 2016/0012796 A1 | 1/2016 | Zeng et al. | |
| 2017/0255169 A1* | 9/2017 | Lee | G06F 3/1438 |
| 2018/0164589 A1* | 6/2018 | Watanabe | G06F 3/0481 |

FOREIGN PATENT DOCUMENTS

| | | |
|---|---|---|
| CN | 102187644 A | 9/2011 |
| CN | 102420896 A | 4/2012 |
| CN | 102682740 A | 9/2012 |
| CN | 102981619 A | 3/2013 |
| CN | 103812531 A | 5/2014 |
| CN | 104246688 A | 12/2014 |
| CN | 104636046 A | 5/2015 |
| CN | 104639737 A | 5/2015 |
| CN | 104657482 A | 5/2015 |
| EP | 2 728 446 A2 | 5/2014 |
| EP | 2 871 822 A1 | 5/2015 |
| KR | 10-2010-0130478 A | 12/2010 |
| WO | 2015/068901 A1 | 5/2015 |

\* cited by examiner

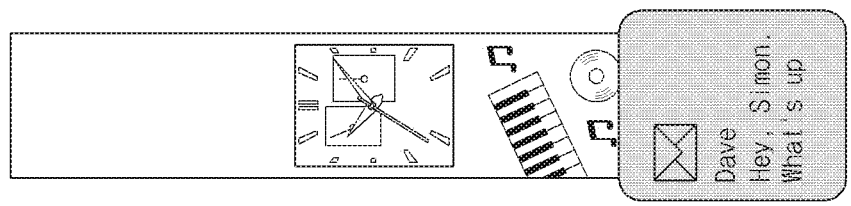
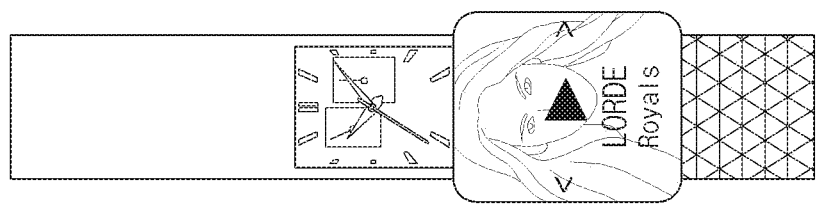
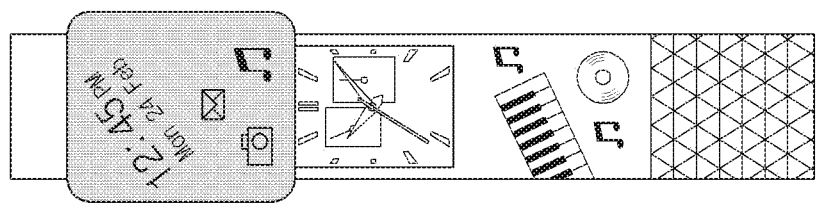
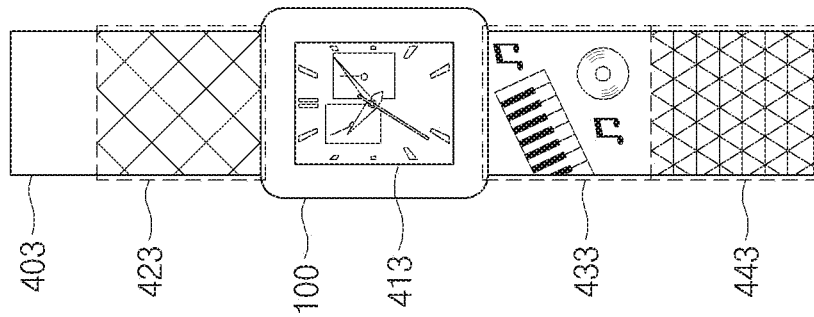
FIG. 7B

ELECTRONIC DEVICE, AND METHOD FOR PROVIDING SCREEN ACCORDING TO LOCATION OF ELECTRONIC DEVICE

TECHNICAL FIELD

The present disclosure relates to a technology for providing a user interface in an electronic device equipped with a transparent display.

BACKGROUND ART

With the development of electronic technologies, various types of electronic products are being developed and distributed. In recent years, there has been a growing interest in the development of electronic devices with a transparent display, in which content is capable of being output and light incident from the outside is capable of being transmitted.

The transparent display is made using transparent electronic elements so as to allow a user to see the opposite side like a window when necessary. For example, the transparent display may be implemented by using transparent oxide semiconductors and transparent electrodes instead of conventional opaque silicon and metals based on the technology of active matrix organic light emitting diodes (AMOLED).

DETAILED DESCRIPTION OF THE INVENTION

Technical Problem

As described above, a transparent display and electronic devices equipped with a transparent display have been actively developed. However, a user interface for effectively utilizing the transparent display has been underdeveloped.

In addition, it may be easy for the electronic device equipped with the transparent display to interact with other electronic devices due to the light transmission characteristics of the transparent display. However, a user interface for easily interacting with other electronic devices has been also underdeveloped.

To solve the above-mentioned problems and tasks issued in this disclosure, embodiments disclosed in the present disclosure may provide a user interface for intuitively interacting between an electronic device including a transparent display and another electronic device.

Technical Solution

According to an embodiment of the present disclosure, an electronic device may include a display including a transparent area through which content is output and through which external light passes and a processor electrically connected to the display. The processor may be configured to obtain information about an overlap location of an external device and the electronic device, to execute a function mapped to the information about the overlap location, and to output a screen associated with the function through the transparent area.

In addition, according to an embodiment of the present disclosure, a screen providing method according to a location of an electronic device including a display may include obtaining information about an overlap location of an external device operating in conjunction with the electronic device and the electronic device, executing a function mapped to information about the overlap location to output a screen associated with the function through a transparent area of the display.

Furthermore, according to an embodiment of the present disclosure, a computer-readable recording medium may store an instruction that, when executed by at least one processor included in an electronic device, causes the processor to obtain information about an overlap location of an external device and the electronic device, to execute a function mapped to information about the overlap location to output a screen associated with the function through a transparent area of the display.

Other aspects, advantages, and salient features of the disclosure will become apparent to those skilled in the art from the following detailed description, which, taken in conjunction with the annexed drawings, discloses various embodiments of the present disclosure.

Advantageous Effects of the Invention

According to various embodiments of the present disclosure, a user interface capable of easily performing the functions required by the user in a wearable electronic device equipped with a transparent display may be provided by performing the specified function based on the location of the transparent display movable along the strap.

In addition, in a state where the electronic device operates in conjunction with the mobile device, the utilization of the electronic device equipped with the transparent display may be improved by implementing the function associated with the mobile device based on the area overlapped with the mobile device or a distance from the mobile device.

Besides, a variety of effects directly or indirectly understood through this disclosure may be provided.

DESCRIPTION OF THE DRAWINGS

FIGS. 7A to 7E illustrate an exemplary operation environment of an electronic device in which a strap is accommodated, according to an embodiment.

BEST MODE

Figure 1:
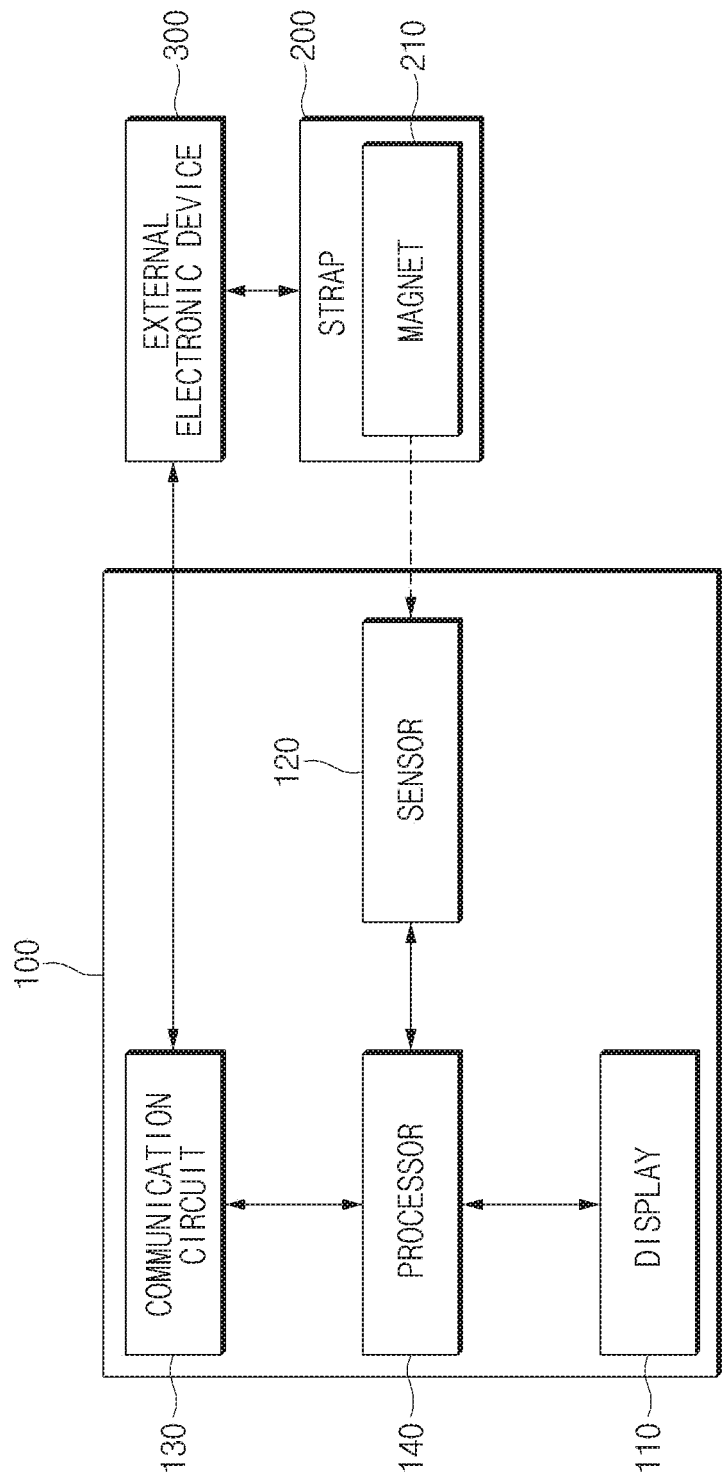
FIG. 1 is a block diagram illustrating a configuration of an electronic device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a block diagram illustrating a configuration of an electronic device, according to an embodiment.

Referring to FIG. 1, an electronic device 100 may include a display 110, a sensor 120, a communication circuit 130, and a processor 140. The electronic device 100 may be operatively connected to a strap 200 and an external electronic device 300. The strap 200 may include a magnet 210 and a watch 220.

The electronic device 100 may be coupled to the strap 200. The electronic device 100 may be, for example, a device that is capable of being worn by the strap 200 to the user.

According to an embodiment, the cross-section of the electronic device 100 may be in the shape of a closed curve or open curve that is capable of surrounding the strap 200. The electronic device 100 may include a housing configured to accommodate the strap 200. For example, the housing of the electronic device 100 may include a hole in a shape corresponding to the strap 200; in the case where the strap 200 is accommodated inside the hole, the housing may be formed in a shape surrounding the strap 200. For another example, the housing of the electronic device 100 may cover both of the front and side surfaces of the strap 200 and may be formed in a shape covering a part of the rear surface of the strap 200. The electronic device 100 may be moved by the user along the direction in which the strap 200 extends on the strap 200.

According to an embodiment, the front surface of the electronic device 100 may be formed of a transparent material, and the rear surface of the electronic device 100 may be formed of an opaque material. For example, the display 110 may be disposed on the front surface of the electronic device 100; other elements, other than the display 110, such as the sensor 120, the communication circuit 130, and the processor 140, and the like may be disposed on the rear surface of the electronic device 100.

The display 110 may include a transparent area through which content is output and through which external light passes. The display 110 may be a transparent display. The transparent area of the display 110 may transmit at least part of the light incident on the rear surface of the transparent area to the front surface thereof. The transparent area of the display 110 may transmit light while outputting a screen. The transparent area of the display 110 may allow a user located at the front of the transparent area to visually recognize an object located at the back of the transparent area, for example, the strap 200 or the external electronic device 300. The transparent area of the display 110 may include, for example, a transparent oxide semiconductor film, and may be implemented to adjust transparency. The display 110 may be disposed on the front surface of the electronic device 100. The display 110 may be a touch screen display capable of recognizing a user's touch input.

The sensor 120 may sense a physical quantity capable of defining a location relationship between the electronic device 100 and the strap 200. According to an embodiment, the sensor 120 may sense the magnitude and direction of the magnetic field generated by the magnet. For example, the sensor 120 may sense the magnitude and direction of the magnetic field generated by the magnet 210 included in the strap 200. The sensor 120 may be, for example, a Hall sensor.

The communication circuit 130 may transmit and receive data to and from the external electronic device 300. According to an embodiment, the communication circuit 130 may receive information about the application being executed in the external electronic device 300, from the external electronic device 300. According to an embodiment, the communication circuit 130 may receive information about the strap 200 from the external electronic device 300. The communication circuit 130 may correspond to a circuit that supports communication such as, for example, NFC, Wi-Fi Direct, or Bluetooth Low Energy (BLE).

The processor 140 may be electrically connected to the display 110, the sensor 120, and the communication circuit 130. The processor 140 may control the display 110, the sensor 120, and the communication circuit 130 and may transmit or receive data to or from the display 110, the sensor 120, and the communication circuit 130.

According to an embodiment, the processor 140 may obtain information about the location where the strap 200 or the external electronic device 300 is overlapped with the electronic device 100. In the case where there is an overlapped area where the strap 200 or the external electronic device 300 is overlapped with the electronic device 100, the information about the overlap location may be information indicating the location of the overlapped area. According to an embodiment, the processor 140 may obtain information about the overlap location through the sensor 120. For example, the processor 140 may calculate information about the overlap location based on information about the magnitude and direction of the magnetic field sensed by sensor 120. In particular, in the case where there are two or more magnets 210, the processor 140 may obtain information about the location of the electronic device 100 that is moving in a direction in which the strap 200 extends in a state where the strap 200 is accommodated, based on information about the magnitude and direction of the magnetic field.

According to an embodiment, the processor 140 may execute a function mapped to information about the overlap location. The processor 140 may output a screen associated with the performed function to the transparent area of the display 110. For example, the processor 140 may execute the application corresponding to the information about the overlap location and may output the operation screen of the application to the transparent area. For another example, the processor 140 may call a user interface corresponding to the information about the overlap location and may output the user interface to the transparent area.

Below, embodiments in which the processor 140 performs the function mapped to the information about the overlap location and outputs a screen associated with the performed function in the transparent area will be described in detail with reference to FIGS. 4 to 7.

The strap 200 may be implemented in the form capable of being inserted into the electronic device 100. The strap 200 may be linear. The strap 200 may be of substantially uniform thickness such that the electronic device 100 is capable of moving in a direction in which the strap 200 extends. The strap 200 may be formed of a flexible material so as to be worn by the user. The strap 200 may be in the form of a chain so as to be worn by the user.

The magnet 210 may generate a magnetic field. The magnetic field generated by the magnet 210 may be sensed by the sensor 120 of the electronic device 100. The magnet 210 may be attached to the strap 200 or may be inserted into the strap 200. The strap 200 may include two or more magnets 210. The location relationship between the electronic device 100 and the strap 200 may be defined by the magnetic field generated by the two or more magnets 210.

The external electronic device 300 may transmit and receive data to and from the electronic device 100. The external electronic device 300 may be a computing device at least including a processor, a memory, a display, and a communication circuit.

According to an embodiment, the external electronic device 300 may provide information about the function being performed in the external electronic device 300, to the electronic device 100. For example, the external electronic device 300 may send information about the application being executed in the external electronic device 300, to the electronic device 100. For another example, the external electronic device 300 may transmit information about the screen capable of being output to the display 110 of the electronic device 100, to the electronic device 100.

According to an embodiment, the external electronic device 300 may be connected to the strap 200. In the case where the strap 200 is connected to the external electronic device 300, the external electronic device 300 may recognize a type of the strap 200. In the case where the type of the strap 200 is recognized, the external electronic device 300 may transmit information about the type of the strap 200 to the electronic device 100.

Figure 2:
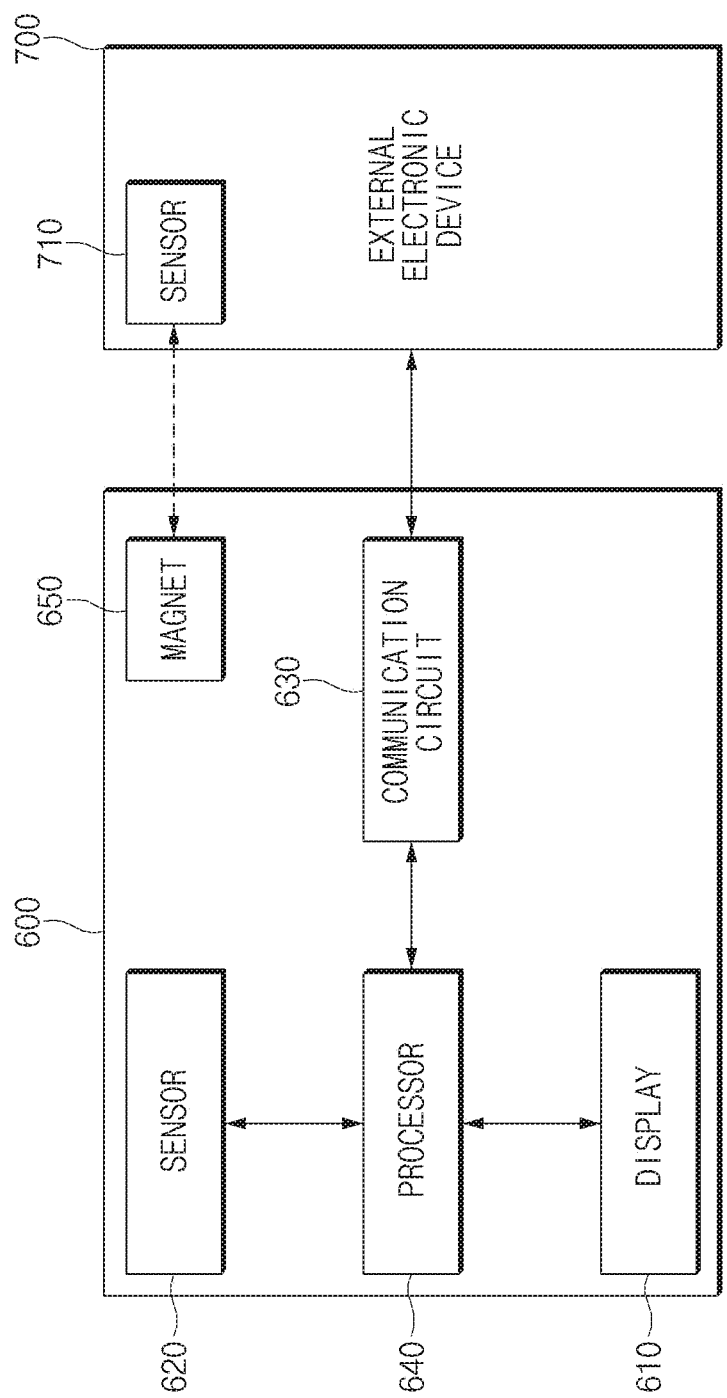
FIG. 2 is a block diagram illustrating a configuration of the electronic device, according to an embodiment.

FIG. 2 is a block diagram illustrating a configuration of the electronic device, according to an embodiment.

Referring to FIG. 2, an electronic device 600 may include a display 610, a sensor 620, a communication circuit 630, a processor 640, and a magnet 650. The electronic device 600 may be operatively connected to an external electronic device 700. The external electronic device 700 may include a sensor 710.

The electronic device 600 may be interlocked with the external electronic device 700. The electronic device 600 may be a computing device capable of operating independently. The electronic device 600 may provide the user with a screen associated with the external electronic device 700.

According to an embodiment, the electronic device 600 may be in the form of a plate. The central part of the electronic device 600 may be made of a transparent material, and the peripheral part of the electronic device 600 may be made of an opaque material. The display 610 may be disposed in the central part of the electronic device 600; other elements, other than the display 610, such as the sensor 620, the communication circuit 630, the processor 640, the magnet 650, and the like may be disposed in the peripheral part of the electronic device 600. A user may visually recognize an object located on the rear surface of the central part through the central part of the electronic device 600.

The display 610 may include a transparent area through which content is output and through which external light passes. The display 610 may have the same characteristics as the display 110 of FIG. 1. The display 610 may be disposed in the central part of the electronic device 600. The display 610 may be a touch screen display capable of recognizing a user"s touch input.

According to an embodiment, the display 610 may include a transparent area. The transparent area of the display 610 may be overlapped with the external electronic device 700. The function performed in the electronic device 600 may be determined depending on the area of the external electronic device 700 overlapped with the transparent area of the display 610.

The sensor 620 may sense a physical quantity capable of defining a distance between the electronic device 600 and the external electronic device 700. According to an embodiment, the sensor 620 may be an ultrasonic sensor capable of sensing the distance between the electronic device 600 and the external electronic device 700.

The communication circuit 630 may transmit and receive data to and from the external electronic device 700. For example, the communication circuit 630 may receive the installation package of the application installed in the external electronic device 700, from the external electronic device 700. For another example, the communication circuit 630 may transmit the installation package of the application stored in the electronic device 600, to the external electronic device 700. For another example, the communication circuit 130 may receive information about the application being executed in the external electronic device 700, from the external electronic device 700. For another example, the communication circuit 130 may receive information about the screen of the external electronic device 700 overlapped with the transparent area of the display 110, from the external electronic device 700. According to an embodiment, the communication circuit 630 may transmit or receive data to or from a home appliance other than the external electronic device 700. The communication circuit 630 may be a circuit that supports communication such as, for example, NFC, Wi-Fi Direct, or Bluetooth Low Energy (BLE).

The processor 640 may be electrically connected to the display 610, the sensor 620, and the communication circuit 630. The processor 640 may control the display 610, the sensor 620, and the communication circuit 630 and may transmit or receive data to or from the display 610, the sensor 620, and the communication circuit 630.

According to an embodiment, the processor 640 may obtain information about the location where the external electronic device 700 is overlapped with the electronic device 600, from the external electronic device 700 through the communication circuit 630. The information about the overlap location may be information indicating the location of an area where the external electronic device 700 is overlapped with the electronic device 600. For example, the processor 640 may receive information about the magnitude and direction of the magnetic field sensed by the sensor 710 of the external electronic device 700, from the external electronic device 700, and may calculate information about the overlap location based on information about the magnitude and direction of the received magnetic field. For another example, the processor 640 may receive information about the overlap location calculated by the external electronic device 700, from the external electronic device 700.

According to an embodiment, the processor 640 may execute a function mapped to the information about the overlap location and may output a screen associated with the executed function to the transparent area of the display 610. For example, the processor 140 may execute the application corresponding to the information about the overlap location and may output the operation screen of the application to the transparent area. For another example, the processor 140 may call a user interface corresponding to the information about the overlap location and may output the user interface to the transparent area. For another example, the processor 140 may receive data corresponding to the information about the overlap location from the external electronic device 700 or may transmit the data to the external electronic device 700.

Below, embodiments in which the processor 640 performs the function mapped to the information about the overlap location and outputs a screen associated with the performed function in the transparent area will be described in detail with reference to FIGS. 8 to 17.

The magnet 650 may generate a magnetic field. The magnet 650 may be disposed in the peripheral part of the electronic device 600. For example, the magnet 650 may be implemented in the form surrounding the transparent area of display 610. The magnetic field generated by the magnet 650 may be sensed by the sensor 710 of the external electronic device 700. The location relationship between the electronic device 600 and the external electronic device 700 may be defined by the magnetic field generated by the magnet 650.

The external electronic device 700 may transmit and receive data to and from the electronic device 600. The external electronic device 700 may be a computing device at least including a processor, a memory, a display, and a communication circuit. The external electronic device 700 may be, for example, a mobile device. According to an embodiment, the external electronic device 700 may transmit data associated with the information about the overlap location to the electronic device 600. According to an embodiment, the external electronic device 700 may transmit information about an application being executed in the external electronic device 700, to the electronic device 600. According to an embodiment, the external electronic device 700 may transmit the installation package of the application installed in the external electronic device 700, to the electronic device 600. According to an embodiment, the external electronic device 700 may receive the installation package of the application from the electronic device 600. According to an embodiment, the external electronic device 700 may receive information about home appliances that operates in conjunction with the electronic device 600, from the electronic device 600.

The sensor 710 may sense a physical quantity capable of defining the overlap location between the electronic device 600 and the external electronic device 700. According to an embodiment, the sensor 710 may sense the magnitude and direction of the magnetic field generated by the magnet 650 of the electronic device 600. The sensor 710 may be, for example, a Hall sensor.

Figure 3:
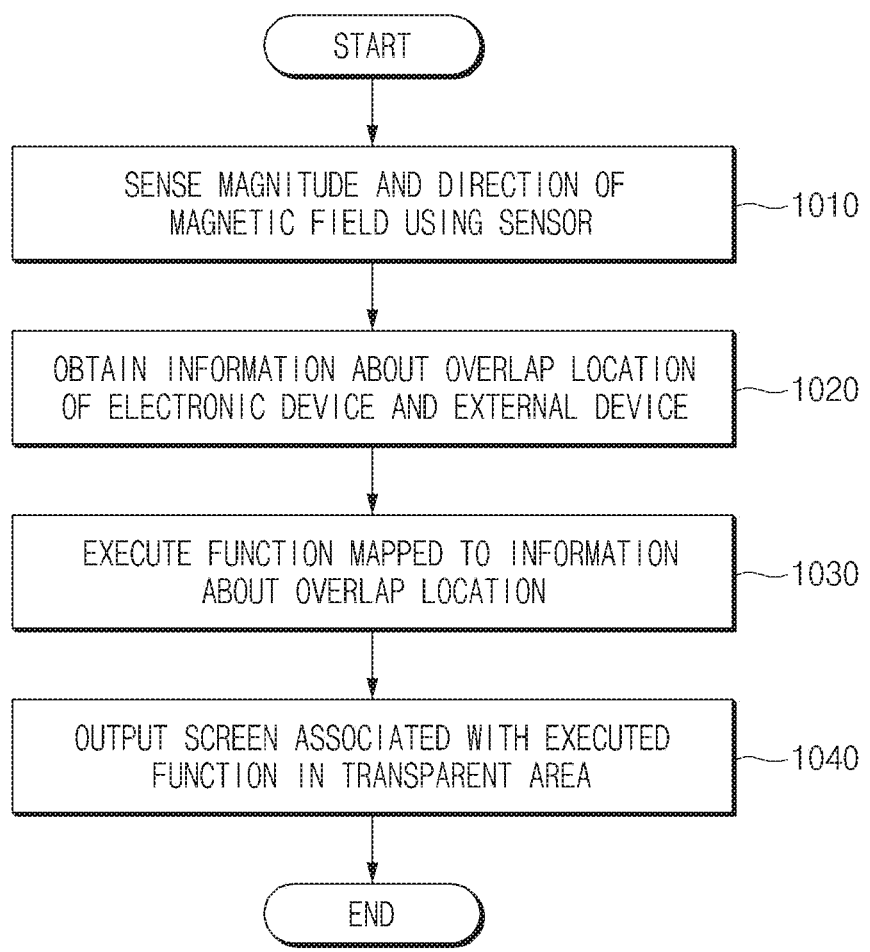
FIG. 3 is a flowchart illustrating a screen providing method according to a location of an electronic device, according to an embodiment.

FIG. 3 is a flowchart illustrating a screen providing method according to a location of an electronic device, according to an embodiment.

The flowchart illustrated in FIG. 3 may include operations that the electronic devices 100 and 600 illustrated in FIGS. 1 to 2 process. Accordingly, even though omitted below, contents of the electronic device 100 and the electronic device 600 described with reference to FIGS. 1 to 2 may be applied to the flowchart illustrated in FIG. 3.

Referring to FIG. 3, in operation 1010, the electronic device 100 may sense the magnitude and direction of the magnetic field through the sensor 120. The electronic device 100 may sense the magnitude and direction of the magnetic field generated by the magnet 210 through, for example, the sensor 120 that includes a Hall sensor.

In operation 1020, the electronic device 100 may obtain information about the overlap location of the electronic device 100 and an external device (e.g., the strap 200). For example, the electronic device 100 may obtain information about an area where the electronic device 100 is overlapped with the external device, based on the magnitude and direction of the sensed magnetic field.

According to another embodiment of the present disclosure, the electronic device 600 may obtain information about the overlap location of the electronic device 600 and the external electronic device 700, from the external electronic device 700. For example, the electronic device 600 may receive information about the magnitude and direction of the magnetic field sensed through the sensor 710 of the external electronic device 700 and may calculate information about the overlap location based on the received information. For another example, the electronic device 600 may receive information about the overlap location that is calculated by the external electronic device 700 based on the magnitude and direction of the magnetic field sensed by the sensor 710.

In operation 1030, the electronic device 100 (or the electronic device 600) may execute the function mapped to the information about the overlap location. The electronic device 100 may perform different functions depending on the overlap location. For example, when being placed at the first location with respect to the external device, the electronic device 100 may perform a first application; when being placed at the second location with respect to the external device, the electronic device 100 may perform a second application. For another example, the electronic device 100 may receive data corresponding to the overlap location from an external device (e.g., the external electronic device 300 or 700) or transmit the data to the external device.

In operation 1040, the electronic device 100 (or the electronic device 600) may output a screen associated with the function executed in the transparent area. For example, the electronic device 100 may output an operation screen or a user interface, which is associated with the executed application, to the transparent area. For another example, the electronic device 100 may output an icon of data received from the external device or transmitted to the external device, in the transparent area.

Below, embodiments associated with operation 1030 and operation 1040 will be described in detail with reference to FIGS. 4 to 17.

FIGS. 4, 5, 6, and 7A to 7E illustrate an exemplary operation environment of an electronic device in which a strap is accommodated, according to an embodiment.

Referring to FIGS. 4, 5, 6, and 7A to 7E, the electronic device 100 may accommodate the strap 200. The electronic device 100 may be slid by the user in the direction in which the strap 200 extends on the strap 200. The electronic device 100 may include a transparent area. The transparent area of the electronic device 100 may be disposed on the front surface of the electronic device 100. In the case where the strap 200 is accommodated in the electronic device 100, the strap accommodated in the electronic device 100 may be visually recognized by the user through the transparent area of the electronic device 100. The strap 200 may include a first magnet 211 and a second magnet 212 that are attached on the strap 200. As illustrated in FIGS. 4 to 7, the electronic device 100 and the strap 200 may be in the form of a watch capable of being worn on a user's wrist.

Figure 4:
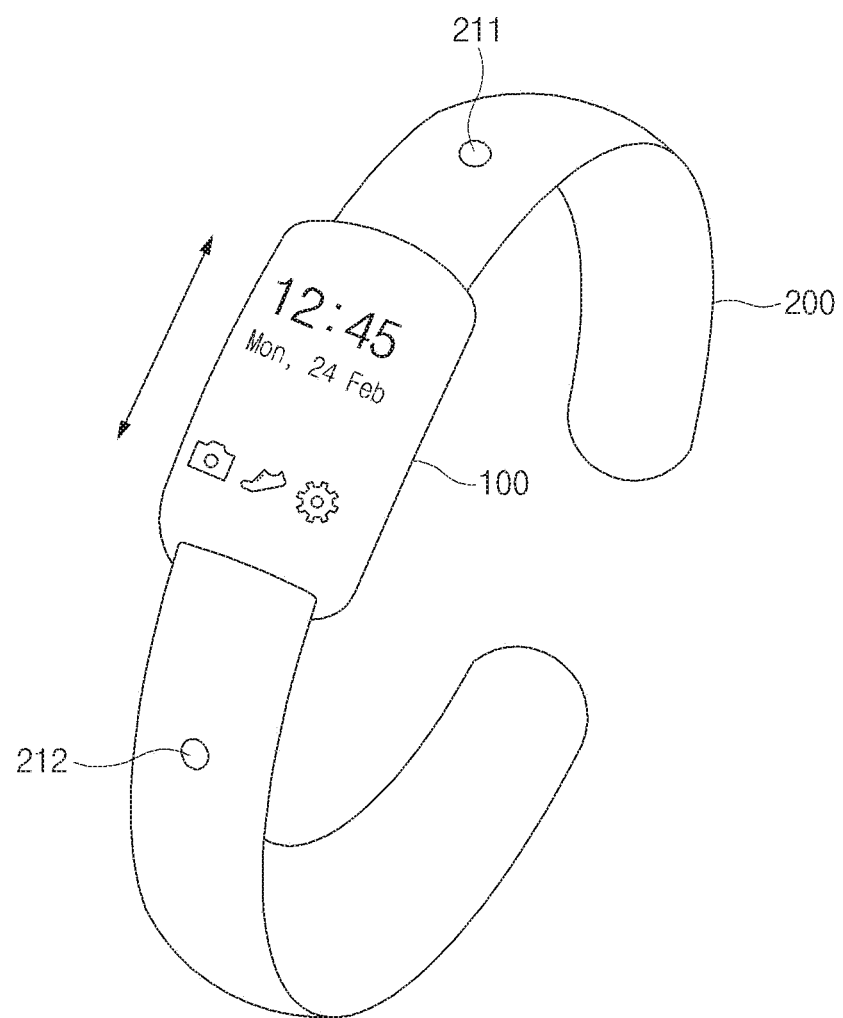
FIG. 4 illustrates an exemplary operation environment of an electronic device in which a strap is accommodated, according to an embodiment.

Referring to FIG. 4, the electronic device 100 may output a home screen to the transparent area. According to an embodiment, in the case where the information about the overlap location is changed, the electronic device 100 may activate the transparent area and may output the home screen to the transparent area.

For example, the electronic device 100 may be slid up or down on the strap 200 by the user. When being slid by the user, the electronic device 100 may sense a change in the area where the electronic device 100 is overlapped with the strap 200. The electronic device 100 may recognize the movement of the electronic device 100 by sensing the magnetic field generated by the first magnet 211 and the second magnet 212. When the movement is recognized, the electronic device 100 may activate the transparent area of a display. The electronic device 100 may output the home screen to a transparent area. The home screen may include, for example, time information, date information, and one or more application icons.

As described above, the electronic device 100 may be activated through on a simple manipulation, by sensing the movement of the electronic device 100 on the strap 200.

Figure 5:
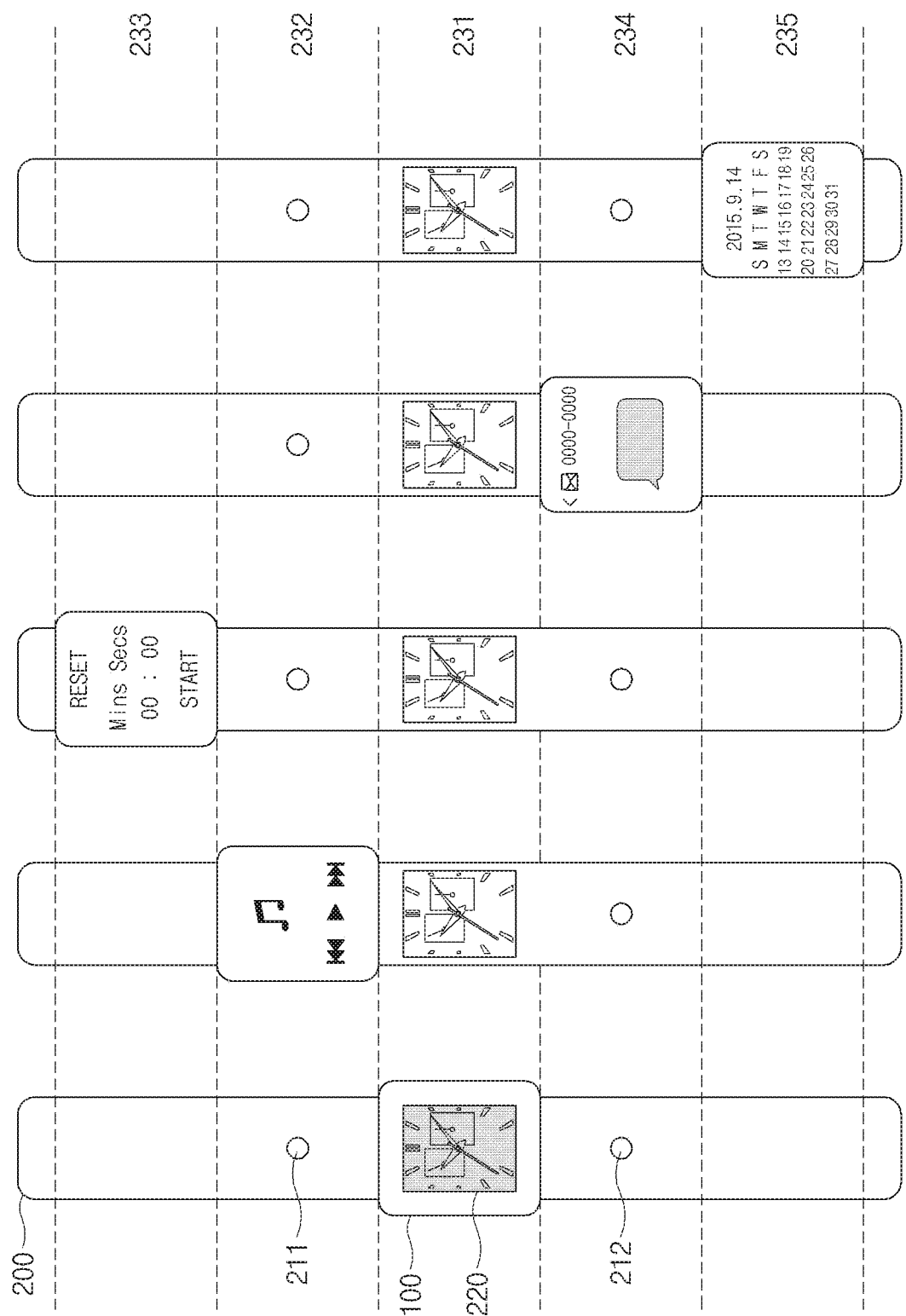
FIG. 5 illustrates an exemplary operation environment of an electronic device in which a strap is accommodated, according to an embodiment.

Referring to FIG. 5, the electronic device 100 may output execution screens of various applications to the transparent area. The strap 200 may be divided into a first area 231, a second area 232, a third area 233, a fourth area 234, and a fifth area 235. The strap 200 may include the watch 220 capable of displaying a time in a central part (or the first area 231). The watch 220 may be attached to the strap 200 or may be inserted into the strap 200. The watch 220 may have an analog type or a digital type.

According to an embodiment, in the case where the electronic device 100 is moved onto a specified location on the strap 200, the electronic device 100 may perform a function mapped to the specified location.

For example, the electronic device 100 may be slid by the user into the first area 231, the second area 232, the third area 233, the fourth area 234, or the fifth area 235 of the strap 200. When being slid by the user, the electronic device 100 may obtain information about the location where the electronic device 100 is overlapped with the strap 200. The electronic device 100 may determine whether the electronic device 100 is overlapped with the strap 200 in any of the first area 231, the second area 232, the third area 233, the fourth area 234, or the fifth area 235, based on the magnitude and direction of the magnetic field generated by the first magnet 211 and the second magnet 212.

In the case where the electronic device 100 is located on the first area 231, the electronic device 100 may deactivate the transparent area of the display. The electronic device 100 may keep the transparent area in a state where the light transmittance is high. The user of the electronic device 100 may visually recognize the watch 220 located on the rear surface of the transparent area, through the transparent area.

In the case where the electronic device 100 is moved to the second area 232, the electronic device 100 may perform the function mapped to the second area 232. For example, the electronic device 100 may perform a music playing application. The electronic device 100 may output the execution screen of the music playing application to the transparent area.

In the case where the electronic device 100 is moved to the third area 233, the electronic device 100 may perform the function mapped to the third area 233. For example, the electronic device 100 may perform a stopwatch application. The electronic device 100 may output the execution screen of the stopwatch application to the transparent area.

In the case where the electronic device 100 is moved to the fourth area 234, the electronic device 100 may perform the function mapped to the fourth area 234. For example, the electronic device 100 may perform a SMS application. The electronic device 100 may output a message to the transparent area.

In the case where the electronic device 100 is moved to the fifth area 235, the electronic device 100 may perform the function mapped to the fifth area 235. For example, the electronic device 100 may perform a scheduler application. The electronic device 100 may output the execution screen of the scheduler application to the transparent area.

As described above, the various functions of the electronic device 100 may be selectively used through a simple manipulation, by executing the specified function depending on the location of the electronic device 100.

Figure 6:
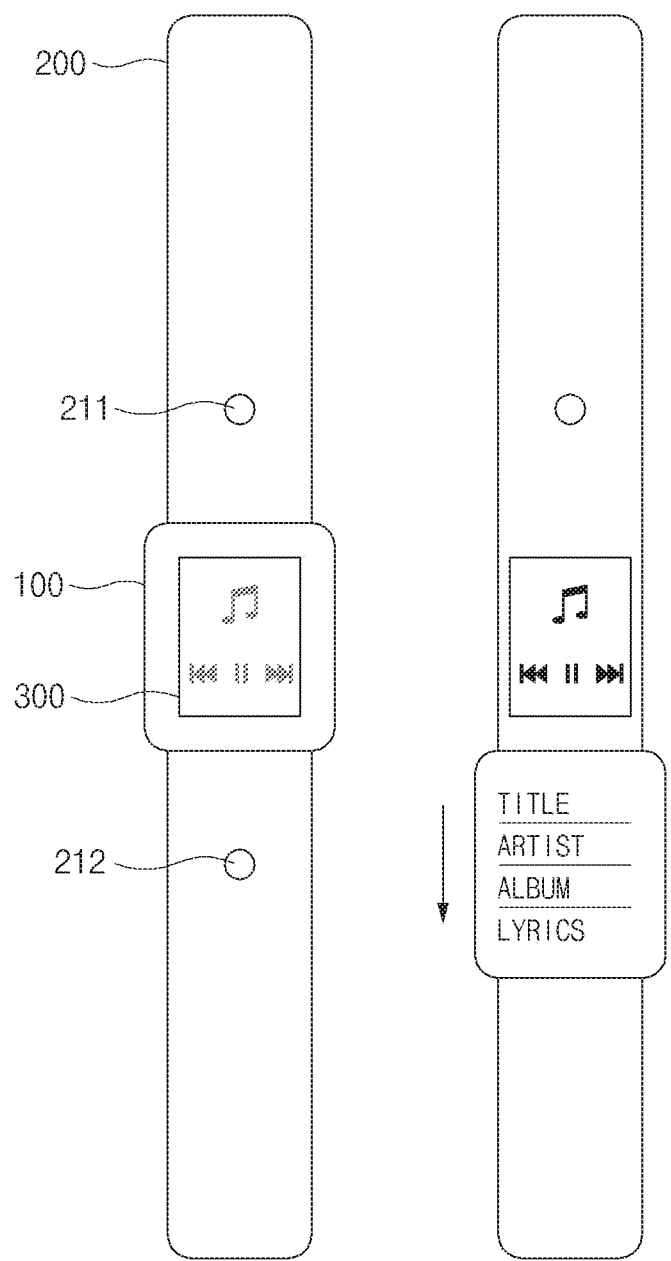
FIG. 6 illustrates an exemplary operation environment of an electronic device in which a strap is accommodated, according to an embodiment.

Referring to FIG. 6, the electronic device 100 may be operatively connected to the external electronic device 300. The electronic device 100 may output a screen associated with the external electronic device 300 to the transparent area. The external electronic device 300 may be attached to the strap 200, may be inserted into the strap 200, or may be integrated with the strap 200. In the case where the strap 200 is inserted into the electronic device 100, the external electronic device 300 may be located on the rear surface of the transparent area of the electronic device 100.

According to an embodiment, in the case where the information about the overlap location is changed, the electronic device 100 may obtain information about the function being executed in the external electronic device 300, through the communication circuit. The electronic device 100 may output a screen associated with the function being executed in the external electronic device 300, to the transparent area.

For example, in the case where the transparent area of the display of the electronic device 100 is located on the external electronic device 300, the electronic device 100 may deactivate the transparent area. In the case where the electronic device 100 is located on the predetermined location, the electronic device 100 may determine that the electronic device 100 is located on the external electronic device 300. The electronic device 100 may keep the transparent area in a state where the light transmittance is high. The user of the electronic device 100 may visually recognize the screen of the external electronic device 300 located on the rear surface of the transparent area, through the transparent area. The external electronic device 300 may perform various functions on the rear surface of the transparent area. For example, the external electronic device 300 may perform the music playing application.

In the case where the transparent area of the electronic device 100 is moved to a location (e.g., the second area 232 or the fourth area 234 in FIG. 5) at which the transparent area of the electronic device 100 is not overlapped with the external electronic device 300, the electronic device 100 may sense a change in the area where the electronic device 100 is overlapped with the strap 200. When the movement of the electronic device 100 is recognized, the electronic device 100 may activate the transparent area. The electronic device 100 may obtain information about the function that the external electronic device 300 is executing, from the external electronic device 300. For example, the electronic device 100 may receive information about the music playing application from the external electronic device 300. The electronic device 100 may provide the transparent area with a screen associated with the function that the external electronic device 300 is executing. For example, when receiving information about the music playing application, the electronic device 100 may output the information about the music being played in the external electronic device 300, to the transparent area. For example, the electronic device 100 may output various pieces of information such as the title, artist, album, and lyrics of the music being played, to the transparent area.

As described above, in the case where the electronic device 100 is moved, the interaction between the electronic device 100 and the external electronic device 300 may be achieved through an intuitive user interface, by performing the function associated with the external electronic device 300.

Figure 7A:
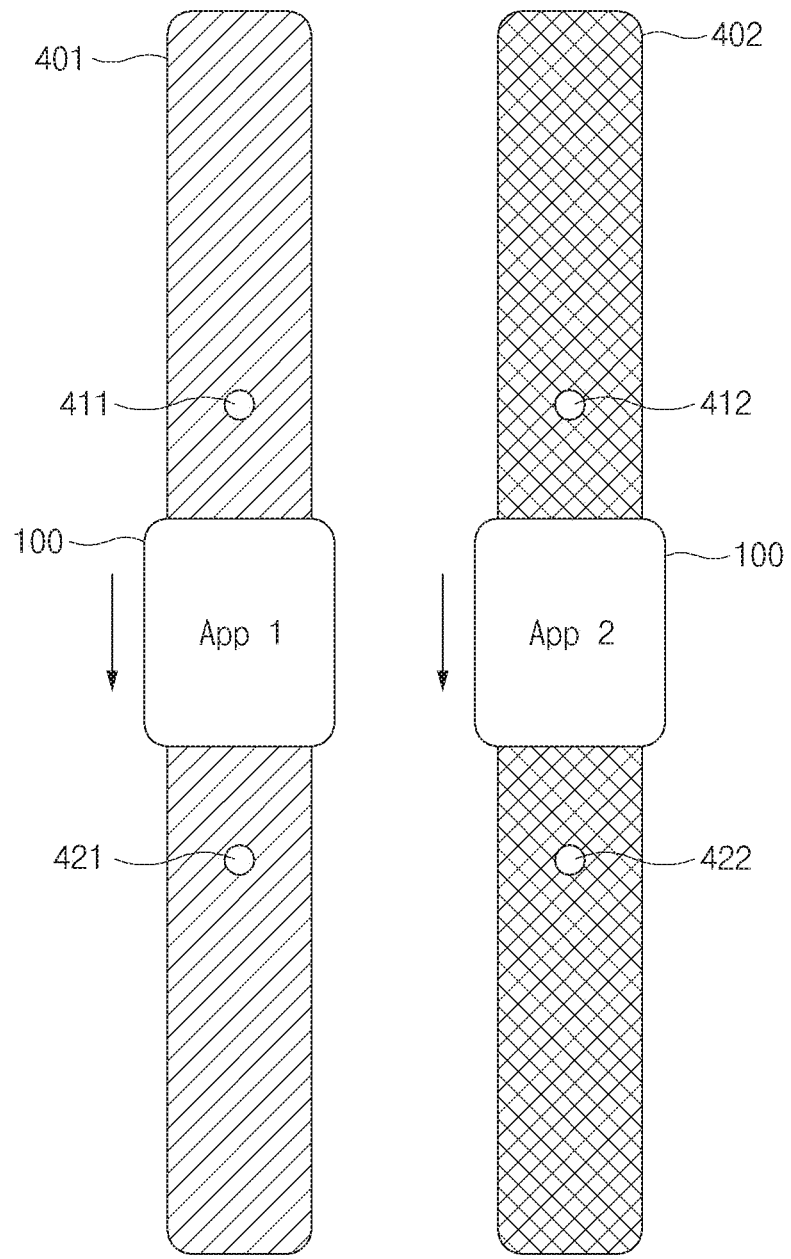

Referring to FIG. 7A, the electronic device 100 may accommodate a first-type strap 401 or a second-type strap 402. The first-type strap 401 and the second-type strap 402 may be made of different colors or materials. The surface of the first-type strap 401 and the surface of the second-type strap 402 may include images of different patterns.

When the first-type strap 401 or the second-type strap 402 is accommodated, the electronic device 100 may recognize the type of the accommodated strap. For example, the electronic device 100 may obtain information about the strap from the accommodated strap. In the case where information about each strap is stored in each strap, the electronic device 100 may obtain the information stored in the strap. In the case where the strap is accommodated, the electronic device 100 may obtain the information about the strap based on the geometric shape of the connection part of the strap that is in contact with the electronic device 100.

For another example, the user may directly select one type from a list of types of straps, and then the electronic device 100 may recognize the selected type. In the case where the user selects one type from a list of types of straps, the electronic device 100 may recognize that the selected type is the type of the accommodated strap.

For another example, the electronic device 100 may obtain information about the accommodated strap by using the camera included in the electronic device 100. The electronic device 100 may capture the accommodated strap by using the camera. The electronic device 100 may recognize the type of accommodated strap, by recognizing the color, material, or pattern based on the captured image.

For another example, the electronic device 100 may obtain information about the accommodated strap through an external electronic device (e.g., the external electronic device 300 of FIG. 6). The external electronic device may obtain the information about the accommodated strap in the above-mentioned manner. The electronic device 100 may receive the information obtained by the external electronic device, from the external electronic device.

According to an embodiment, the electronic device 100 may obtain type information about the first-type strap 401 or the second-type strap 402 and may perform the function mapped to information about the type of the strap. The electronic device 100 may recognize that the accommodated strap is the first-type strap 401 or the second-type strap 402. For example, in the case where the first-type strap 401 is accommodated, the electronic device 100 may execute the first application when the electronic device 100 is slid by the user. For another example, in the case where the second-type strap 402 is accommodated, the electronic device 100 may execute the second application when the electronic device 100 is slid by the user.

For example, in the case where the strap of rubber material is accommodated, the electronic device 100 may execute an exercise quantity management application; in the case where the strap of leather material is accommodated, the electronic device 100 may execute a scheduler application. That is, it is possible to provide a user interface suitable for the function of the strap, by changing the function to be executed depending on the type of the strap.

According to an embodiment, the electronic device 100 may obtain the color information of the first-type strap 401 or the second-type strap 402 and may change the color of the screen output to the transparent area, based on the color information. The electronic device 100 may recognize the color of the first-type strap 401 or the second-type strap 402. For example, in the case where the first-type strap 401 of a white color is accommodated, the electronic device 100 may change the color of the text output to the transparent area, to a black color. For another example, in the case where the second-type strap 402 of a black color is accommodated, the electronic device 100 may change the color of the text output to the transparent area, to a white color. The electronic device 100 may change the background color of the screen output to the transparent area, depending on the color of the strap.

As described above, the visibility of the screen output to the transparent area may be improved by changing the color of the screen depending on the color of the strap.

Referring to FIG. 7B, the electronic device 100 may accommodate a strap 403. The strap 403 may include a watch 413, and may include a first area 423, a second area 433, and a third area 443.

The first area 423 may include a grid pattern. When the electronic device 100 is slid to the first area 423 on the strap 403, the electronic device 100 may recognize the grid pattern displayed in the first area 423. When the grid pattern of the first area 423 is recognized, the electronic device 100 may output, for example, a home screen.

The second area 433 may include a design. The design displayed in the second area 433 may include an image associated with music. When the electronic device 100 is slid to the second area 433 on the strap 403, the electronic device 100 may recognize the design displayed in the second area 433. When the design of the second area 433 is recognized, the electronic device 100 may execute, for example, a music playing application.

The third area 443 may include a triangular pattern. When the electronic device 100 is slid to the third area 443 on the strap 403, the electronic device 100 may recognize the triangular pattern displayed in the third area 443. When the triangular pattern of the third area 443 is recognized, the electronic device 100 may execute, for example, an SMS application.

As described above, the function corresponding to the material or the graphic pattern may be easily performed by recognizing the material or the graphic pattern of the strap 403 at the location where the electronic device 100 is slid.

Figure 7C:
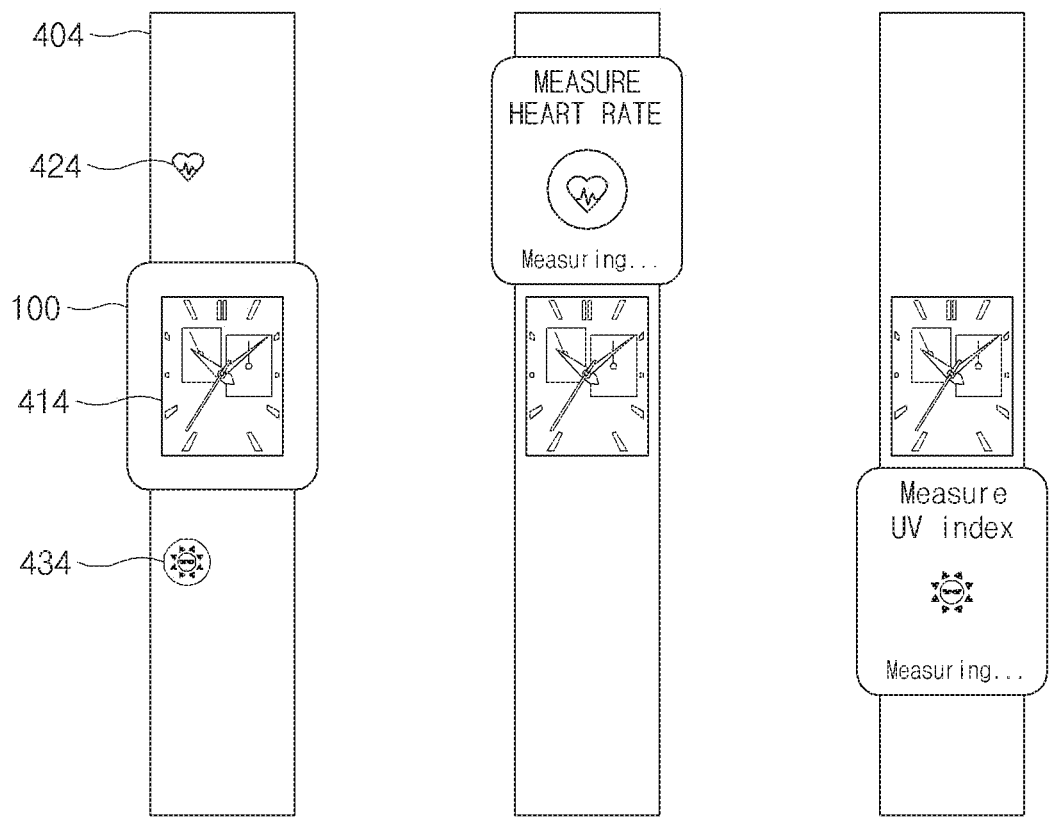

Referring to FIG. 7C, the electronic device 100 may accommodate a strap 404. The strap 404 may include a watch 414, a heart rate sensor 424, and a UV sensor 434.

The heart rate sensor 424 may be disposed on the strap 404. In the case where the strap 404 is worn on the user's wrist, the heart rate sensor 424 may sense a user's heartbeat. When the electronic device 100 is slid onto the heart rate sensor 424, the electronic device 100 may execute a heart rate measurement application. The electronic device 100 may display the heart rate sensed by the heart rate sensor 424.

The UV sensor 434 may be disposed on the strap 404. The UV sensor 434 may sense the intensity of the UV that is incident on the UV sensor 434 from the outside. When the electronic device 100 is slid onto the UV sensor 434, the electronic device 100 may execute a UV intensity measurement application. The electronic device 100 may display the UV intensity sensed by the UV sensor 434.

As described above, the sensor included in the strap 404 may be efficiently utilized by performing the function associated with the sensor overlapped with the electronic device 100 in the case where the sensor is disposed on the strap 404.

Figure 7D:
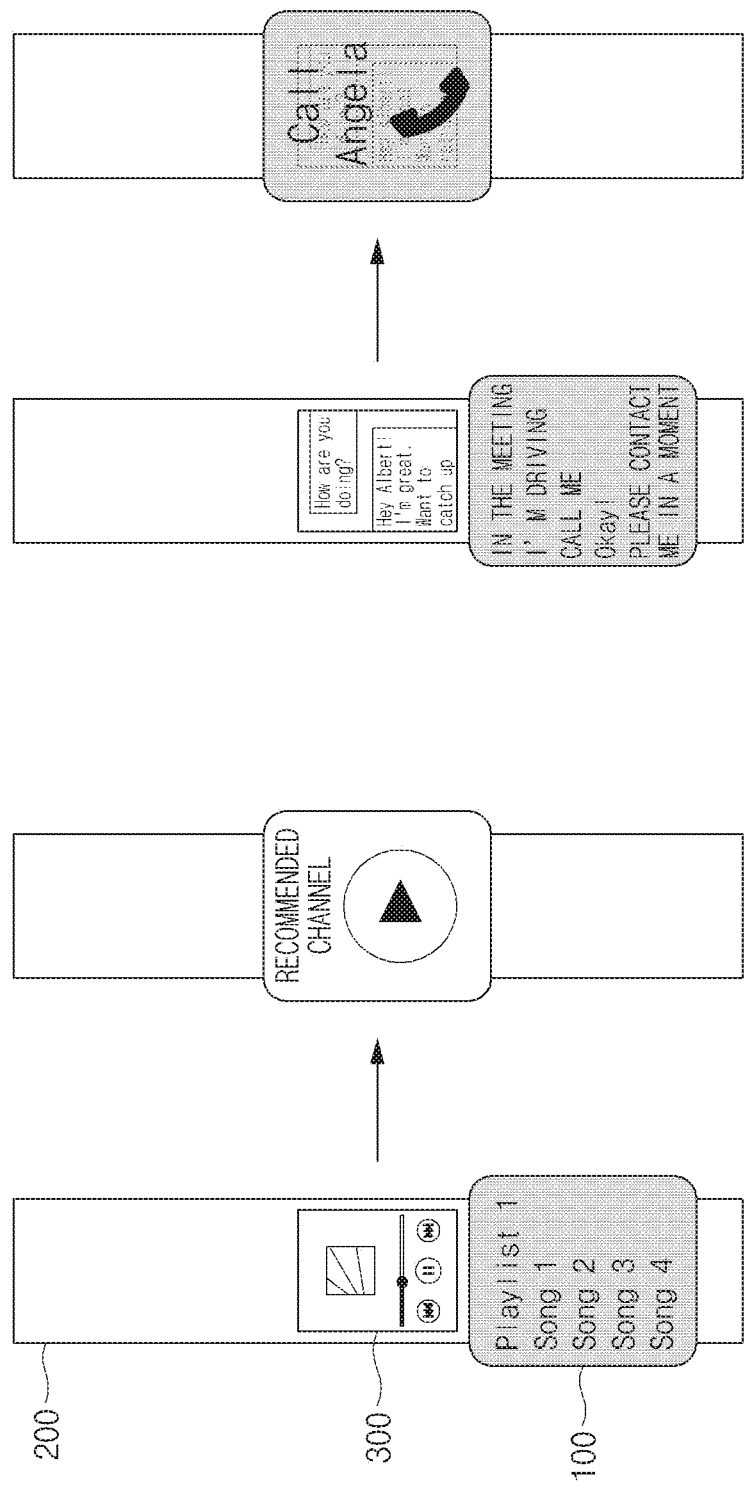

Referring to FIG. 7D, the electronic device 100 may accommodate the strap 200. The electronic device 100 may be operatively connected to the external electronic device 300. The external electronic device 300 may be the external electronic device 300 illustrated in FIG. 6.

The external electronic device 300 may perform various functions. For example, the external electronic device 300 may perform a music playing application or may perform an SMS application.

The electronic device 100 may obtain information about the function that the external electronic device 300 is executing, from the external electronic device 300. For example, the electronic device 100 may obtain information about the music playing application, which is being executed in the external electronic device 300, for example, a playlist. For another example, the electronic device 100 may obtain information about the SMS application, which is being executed in the external electronic device 300, for example, information about the pre-stored answer message.

In the case where the electronic device 100 is slid in the downward direction of the external electronic device 300, the electronic device 100 may display information associated with the function being executed in the external electronic device 300 based on the information obtained from the external electronic device 300. For example, the electronic device 100 may display information about a music playing application, which is being executed in the external electronic device 300, for example, a playlist being played in the external electronic device 300. When an input is applied to the playlist displayed on the electronic device 100, the music played in the external electronic device 300 may be changed. For another example, the electronic device 100 may display a pre-stored answer message associated with the message displayed on the external electronic device 300. When an input is applied to the answer message displayed on the electronic device 100, the answer message may be transmitted to the sender of the message displayed on the external electronic device 300.

In the case where the electronic device 100 is overlapped with the external electronic device 300, the electronic device 100 may display other information associated with the function being executed in the external electronic device 300. The electronic device 100 may display an object for executing another function associated with the function being executed in the external electronic device 300. For example, the electronic device 100 may display an object for connecting to a radio channel associated with music being played in the external electronic device 300. When an input is applied to the object displayed on the electronic device 100, the electronic device 100 may be connected to the radio channel associated with the music being played back. For another example, the electronic device 100 may display an object for making a call to the sender of the message displayed on the external electronic device 300. When an input is applied to the object displayed on the electronic device 100, the electronic device 100 may make a call to the sender of the message.

As described above, various functions derived from the function being executed in the external electronic device 300 may be easily executed by executing the function associated with the external electronic device 300 depending on the location of the electronic device 100.

Figure 7E:
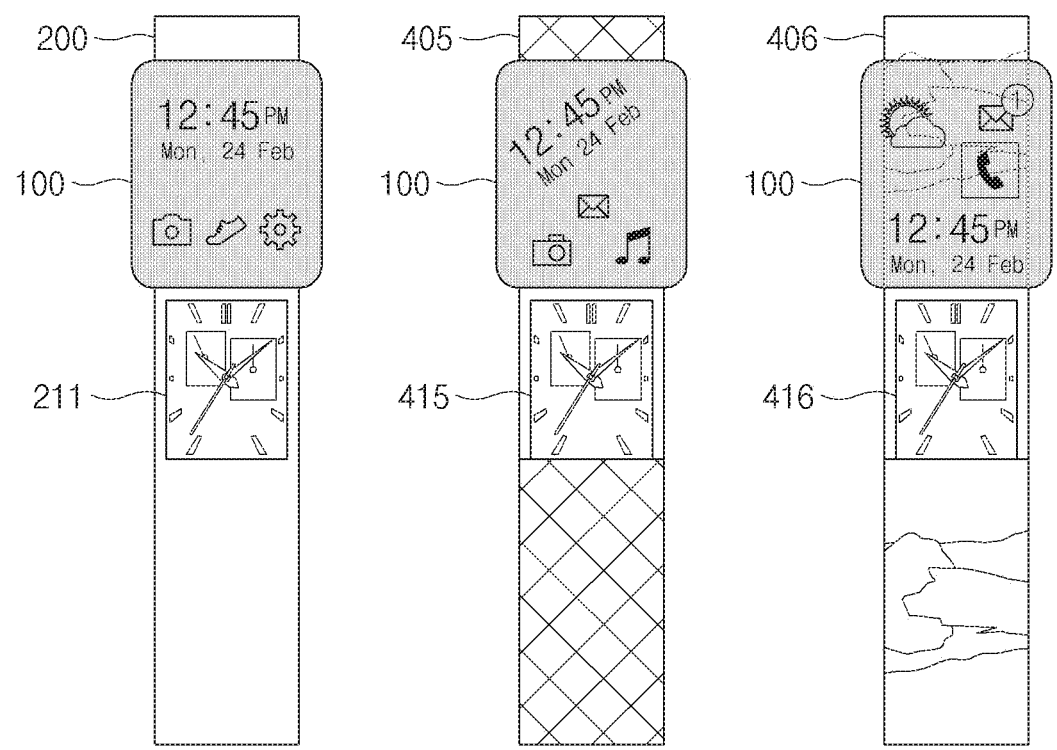

Referring to FIG. 7E, the electronic device 100 may accommodate various straps such as the strap 200, a strap 405, a strap 406, and the like.

The electronic device 100 may recognize the pattern displayed on the strap 200, the strap 405, or the strap 406. When the electronic device 100 is slid on the strap 200, the strap 405, or the strap 406, the electronic device 100 may output a home screen.

The strap 200 may be a plain strap. When the electronic device 100 is slid on the strap 200, the electronic device 100 may output a home screen in a default state.

The strap 405 may include a grid pattern. When the electronic device 100 is slid on the strap 405, the electronic device 100 may output the home screen suitable for the grid pattern. For example, the electronic device 100 may output the text inclined by the slope of the grid pattern and may output the icon within the square of the grid pattern.

The strap 406 may include an irregular pattern. When the electronic device 100 is slid on the strap 406, the electronic device 100 may output the home screen suitable for the irregular pattern. For example, for the purpose of improving the visibility of the icon included in the home screen, the electronic device 100 may change the color of the icon depending on the strap color of a part where the icon is located.

As described above, the layout of the home screen may be variously changed depending on the strap, by recognizing a pattern included in the strap accommodated in the electronic device 100.

FIGS. 8 to 17 illustrate an exemplary operation environment of an electronic device operating in conjunction with an external electronic device, according to an embodiment.

Figure 8:
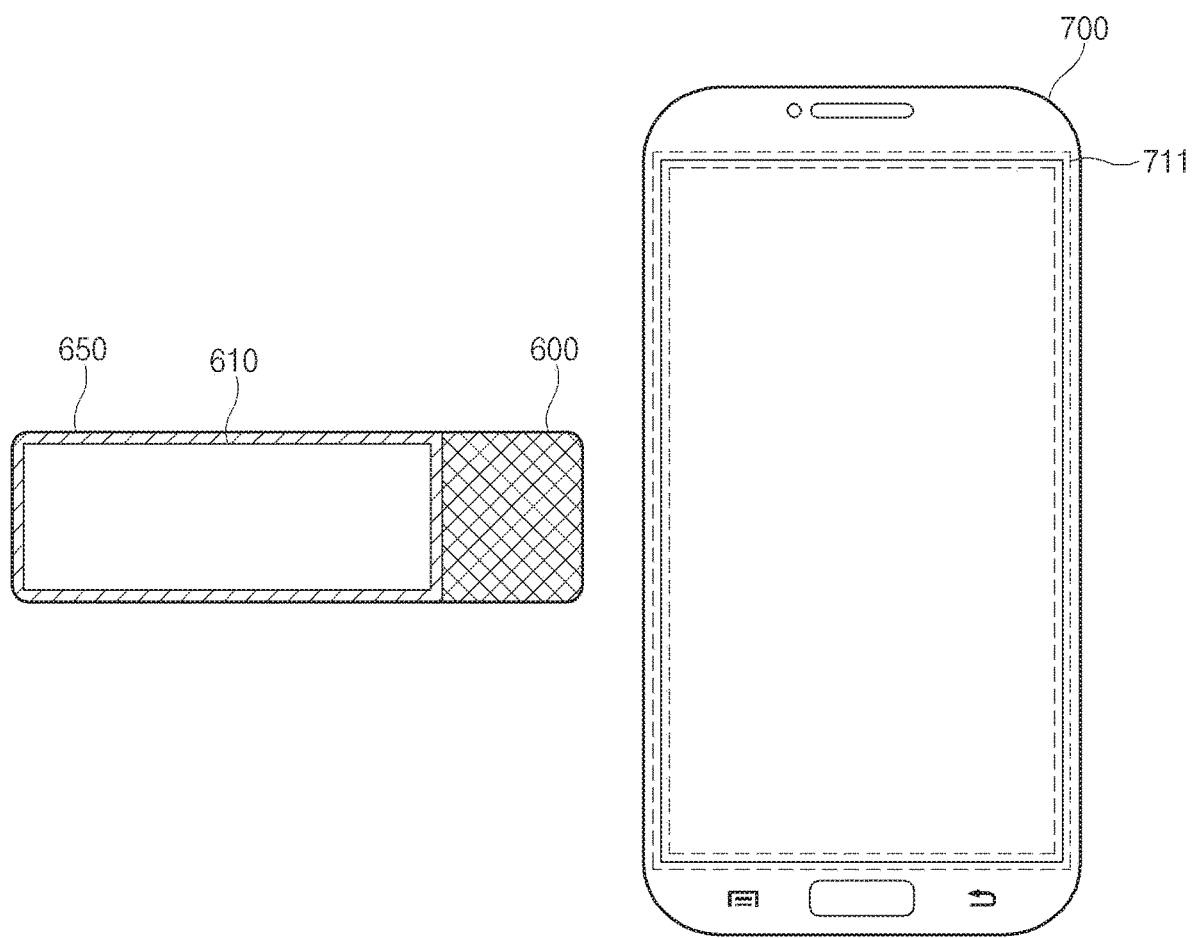
FIG. 8 illustrates an exemplary operation environment of an electronic device operating in conjunction with an external electronic device, according to an embodiment.

Referring to FIG. 8, the electronic device 600 may include the display 610 including a transparent area and the magnet 650. The display 610 may include the transparent area. In the case where the electronic device 600 is overlapped with the external electronic device 700, the screen of the external electronic device 700 may be visually recognized by the user through the transparent area of the electronic device 600. The magnet 650 may be disposed to surround the transparent area of the display 610. Other elements, other than the transparent area of the display 610, such as a sensor, a communication circuit, a processor, and the like may be disposed in the right-side part of the electronic device 600.

The electronic device 600 may be interlocked with the external electronic device 700. The external electronic device 700 may include a Hall sensor. The Hall sensor may sense the magnitude and direction of the magnetic field generated by the magnet 650. The Hall sensor may be disposed in an area 711 that is the peripheral area of the display of the external electronic device 700. The external electronic device 700 may provide information about the magnetic field sensed by the hall sensor to the electronic device 600 or may provide the electronic device 600 with information about the overlap location calculated based on the information about the magnetic field.

Figure 9:
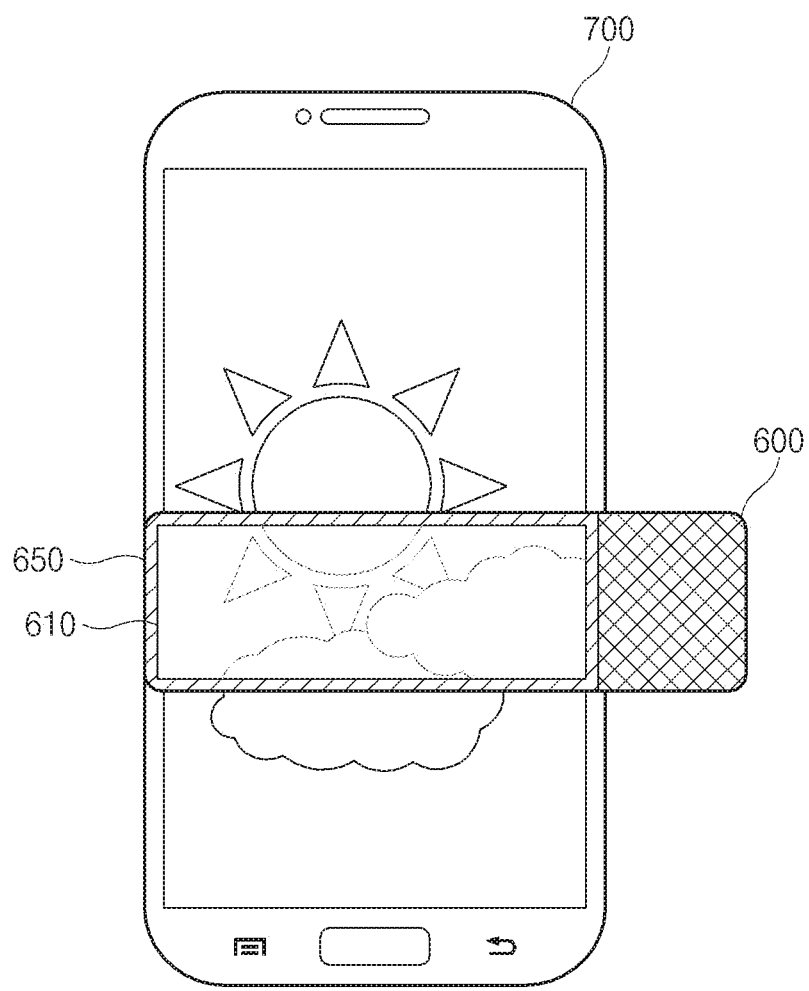
FIG. 9 illustrates an exemplary operation environment of an electronic device operating in conjunction with an external electronic device, according to an embodiment.

Referring to FIG. 9, the display 610 of the electronic device 600 may be in contact with the display of the external electronic device 700. The external electronic device 700 may output an image through the display. The screen output to the external electronic device 700 may be recognized in the transparent area of the electronic device 600 by the user.

According to an embodiment, in the case where the display of the external electronic device 700 is in contact with the transparent area of the electronic device 600, the electronic device 600 may perform a function corresponding to the screen, which is displayed in the area where the transparent area is overlapped with the display of the external electronic device 700, in the screen output to the display of the external electronic device 700.

For example, the electronic device 600 may obtain information about the overlapped area from the external electronic device 700. The electronic device 600 may obtain information about the screen output to the overlapped area, from the external electronic device 700. The external electronic device 700 may recognize the screen output to the overlapped area, based on the information about the overlap location of the electronic device 600 sensed by the Hall sensor. The external electronic device 700 may provide the electronic device 600 with the information about the screen output to the overlapped area. The electronic device 600 may execute a function corresponding to the obtained information. In the case where the information about the image output to the overlapped area is obtained, the electronic device 600 may edit, for example, the image output to the overlapped area. For example, the electronic device 600 may change a characteristic such as the color, sharpness, brightness, contrast ratio, or the like of the image output to the overlapped area. For example, the electronic device 600 may copy or crop the image output to the overlapping area.

As described above, the function to be performed by the user may be accurately performed on the targeted area, by performing various functions on the screen displayed in the overlapped area.

Figure 10:
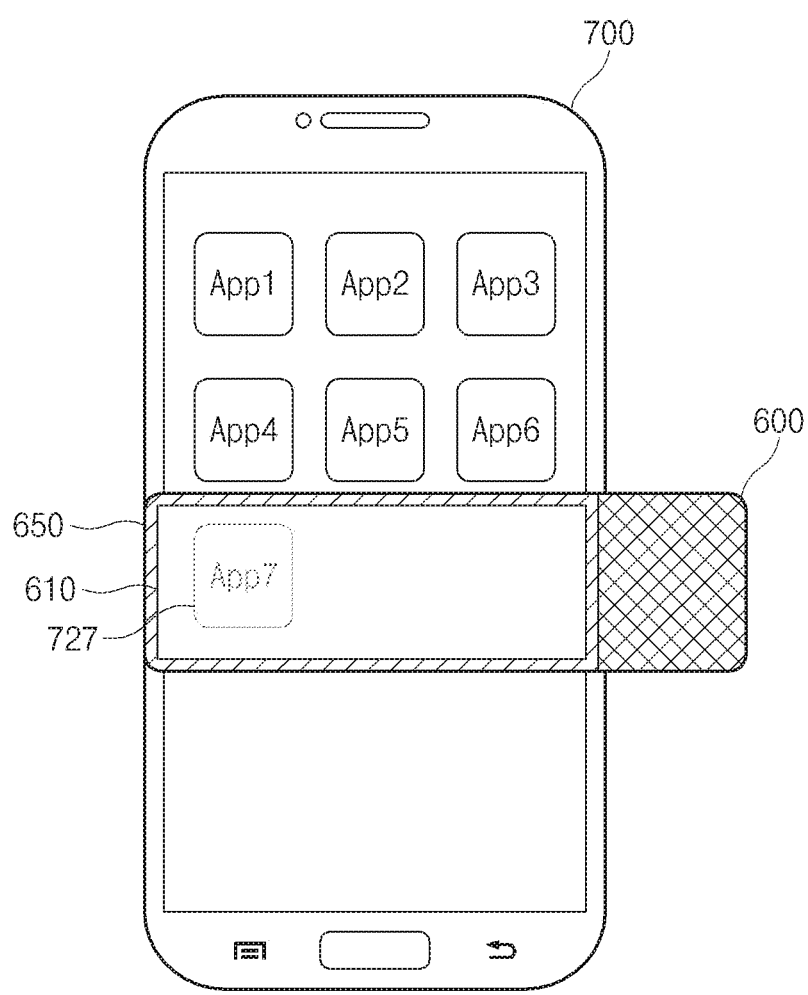
FIG. 10 illustrates an exemplary operation environment of an electronic device operating in conjunction with an external electronic device, according to an embodiment.

Referring to FIG. 10, the display 610 of the electronic device 600 may be in contact with the display of the external electronic device 700. The external electronic device 700 may output icons of a plurality of applications through the display. The display 610 may be overlapped with at least one of the icons output through the external electronic device 700.

According to an embodiment, in the case where the display of the external electronic device 700 is in contact with the transparent area of the electronic device 600, the electronic device 600 may receive data corresponding to the screen, which is displayed in the area where the transparent area of the electronic device 600 is overlapped with the display of the external electronic device 700, in the screen output to the display of the external electronic device 700, from the external electronic device 700 through the communication circuit.

For example, the electronic device 600 may obtain information corresponding to the icon output to the overlapped area, from the external electronic device 700. The external electronic device 700 may recognize the icon output to the overlapped area, based on the information about the overlap location of the electronic device 600 sensed by the Hall sensor. The external electronic device 700 may provide the electronic device 600 with the information about the icon output to the overlapped area. The electronic device 600 may receive data corresponding to the icon output to the overlapped area from the external electronic device 700 through the communication circuit. The electronic device 600 may receive, for example, an application package corresponding to the icon output to the overlapped area. The electronic device 600 may store the received application package. In the case where the application package is stored, the electronic device 600 may output an icon associated with the application package to the transparent area.

As described above, an intuitive user interface capable of easily obtaining data desired by a user may be provided by receiving data associated with a screen output to the overlapped area.

Figure 11:
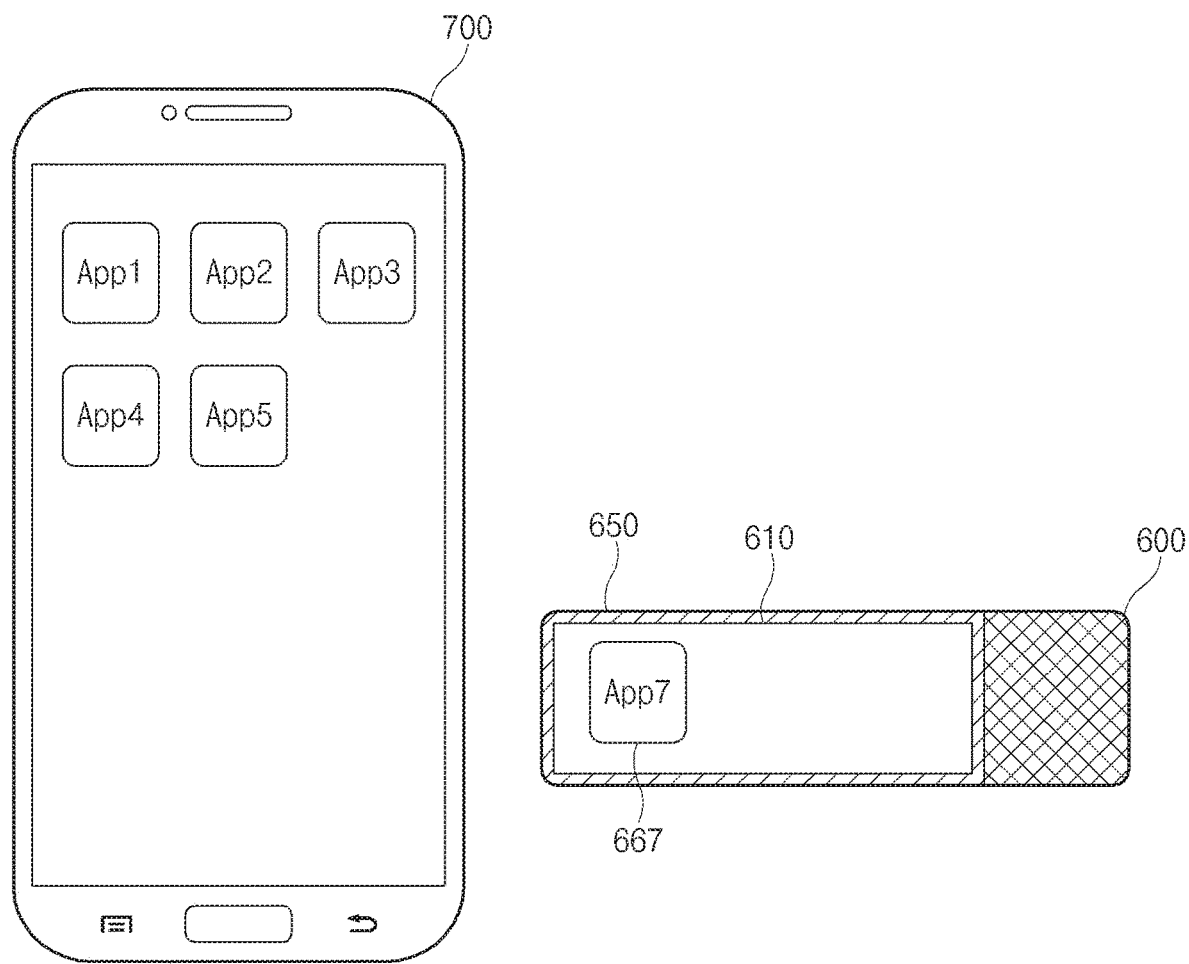
FIG. 11 illustrates an exemplary operation environment of an electronic device operating in conjunction with an external electronic device, according to an embodiment.

Referring to FIG. 11, the display 610 of the electronic device 600 may output an icon 667 of the application stored in the electronic device 600. In a state where the icon 667 is output, the electronic device 600 may be in contact with the external electronic device 700.

According to an embodiment, in the case where the transparent area of the electronic device 600 is in contact with the display of the external electronic device 700, the electronic device 600 may transmit data corresponding to the screen output to the transparent area, to the external electronic device 700 through the communication circuit.

For example, the electronic device 600 may recognize the contact through the external electronic device 700. The external electronic device 700 may recognize the contact of the electronic device 600 through the Hall sensor. The external electronic device 700 may notify the electronic device 600 of the occurrence of the contact. In the case where the electronic device 600 recognizes the contact with the external electronic device 700, the electronic device 600 may transmit data associated with the icon 667 to the external electronic device 700 through the communication circuit. For example, the electronic device 600 may transmit an application package associated with the icon 667 to the external electronic device 700.

AS described above, an intuitive user interface capable of easily transmitting data desired by a user may be provided by transmitting data to the external electronic device 700 in the case where the electronic device 600 is in contact with the external electronic device 700.

Figure 12:
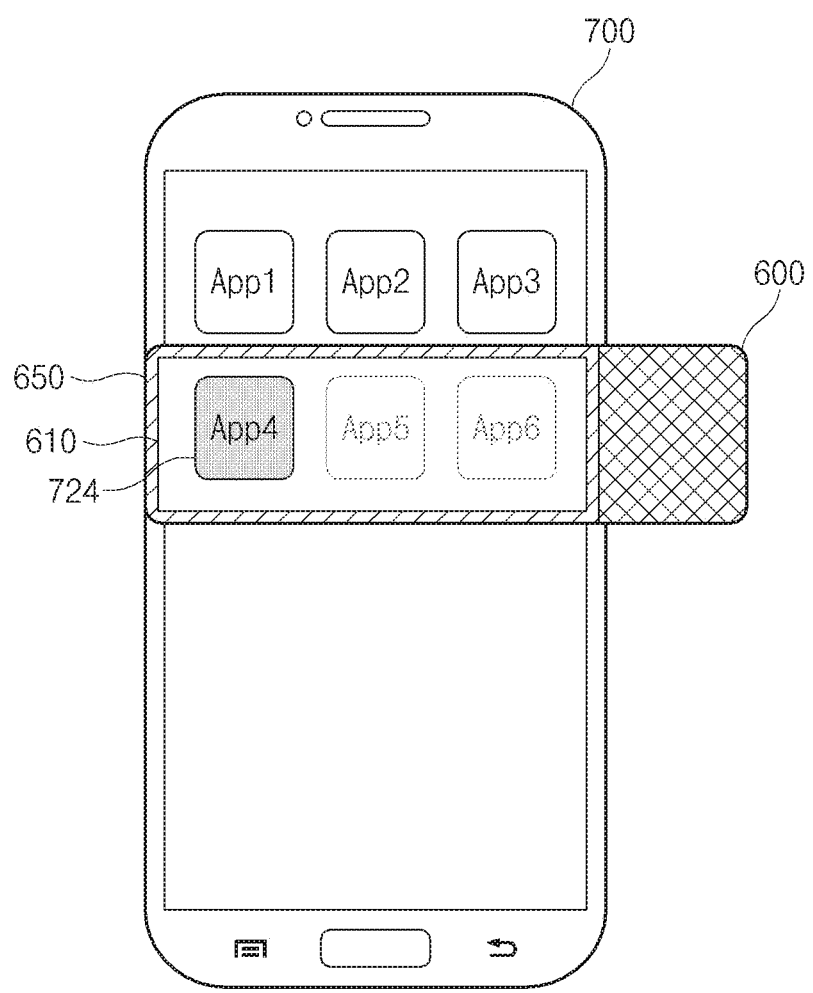
FIG. 12 illustrates an exemplary operation environment of an electronic device operating in conjunction with an external electronic device, according to an embodiment.

Referring to FIG. 12, the display 610 of the electronic device 600 may be in contact with the display of the external electronic device 700. The external electronic device 700 may output icons of a plurality of applications through the display. The display 610 may be overlapped with a part of a plurality of icons output through the external electronic device 700.

According to an embodiment, in the case where the application in the external electronic device 700 is selected from the transparent area after the transparent area of the electronic device 600 is in contact with the display of the external electronic device 700, the electronic device 600 may provide the execution screen of the application to the transparent area.

For example, the transparent area of the electronic device 600 may be overlapped with an icon 724 of the fourth application, an icon of the fifth application, and an icon of the sixth application, which are displayed on the external electronic device 700. A touch input associated with the icon 724 displayed on the external electronic device 700 may be applied to the transparent area of the electronic device 600.

The external electronic device 700 may sense the touch input applied to the transparent area of the electronic device 600. For example, the external electronic device 700 may detect a change in the amount of charge due to the touch input applied to the transparent area of the electronic device 600. The external electronic device 700 may recognize the touch input based on the change in the amount of charge. For another example, the external electronic device 700 may recognize the touch input based on the information about the touch input, which is sensed by the electronic device 600, and the information about the overlapped area. The external electronic device 700 may receive information about the touch input applied to the display 610 of the electronic device 600, from the electronic device 600. The external electronic device 700 may obtain information about an area where the electronic device 600 is overlapped with the external electronic device 700, through the Hall sensor. The external electronic device 700 may recognize the touch input applied to the electronic device 600 by calculating the location, where the touch input is applied, in the overlapped area.

In the case where a touch input associated with the icon 724 is recognized, the external electronic device 700 may execute a fourth application associated with the icon 724. The external electronic device 700 may transmit information about the execution screen of the fourth application, to the electronic device 600.

The electronic device 600 may receive the information about the execution screen of the fourth application. The electronic device 600 may output the execution screen of the fourth application to the transparent area of the display 610 by using the received information.

As described above, the user may verify the execution screen of the application through the electronic device 600 and may use other functions of the external electronic device 700 at the same time, by providing the execution screen of the application of the external electronic device 700, which is selected through the electronic device 600, to the electronic device 600.

Figure 13:
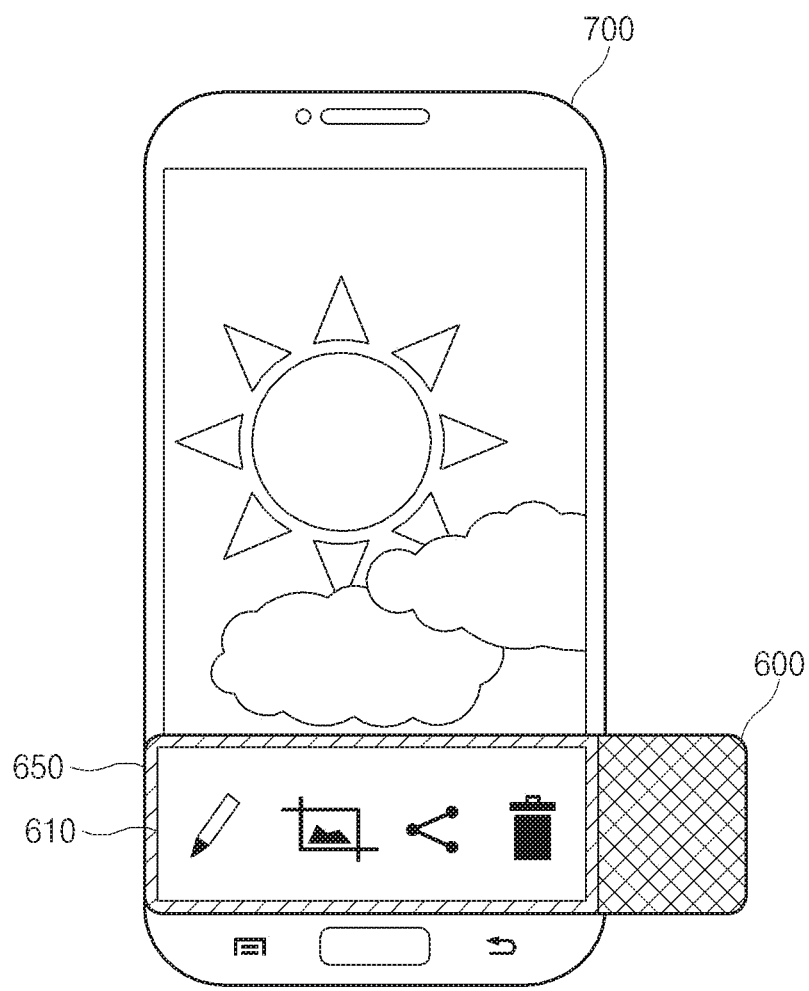
FIG. 13 illustrates an exemplary operation environment of an electronic device operating in conjunction with an external electronic device, according to an embodiment.

Referring to FIG. 13, the display 610 of the electronic device 600 may be in contact with the display of the external electronic device 700. The external electronic device 700 may execute an image editing application and may output an image through the display of the external electronic device 700.

According to an embodiment, in the case where the transparent area of the external electronic device 700 is in contact with the electronic device 600, the electronic device 600 may output the user interface associated with the application, which is being executed in the external electronic device 700, to the transparent area.

For example, the electronic device 600 may receive information about the image editing application being executed in the external electronic device 700, from the external electronic device 700. In the case where the contact of the electronic device 600 is recognized through the Hall sensor, the external electronic device 700 may transmit the information about the image editing application to the electronic device 600. The electronic device 600 may output the user interface associated with the image editing application to the transparent area based on the received information. For example, the electronic device 600 may output a user interface capable of performing a function such as input, selection, sharing, deletion, or the like.

As described above, the user interface being executed may be arbitrarily placed at the location desired by the user, by providing the user interface of the application, which is being executed in the external electronic device 700, through the electronic device 600.

Figure 14:
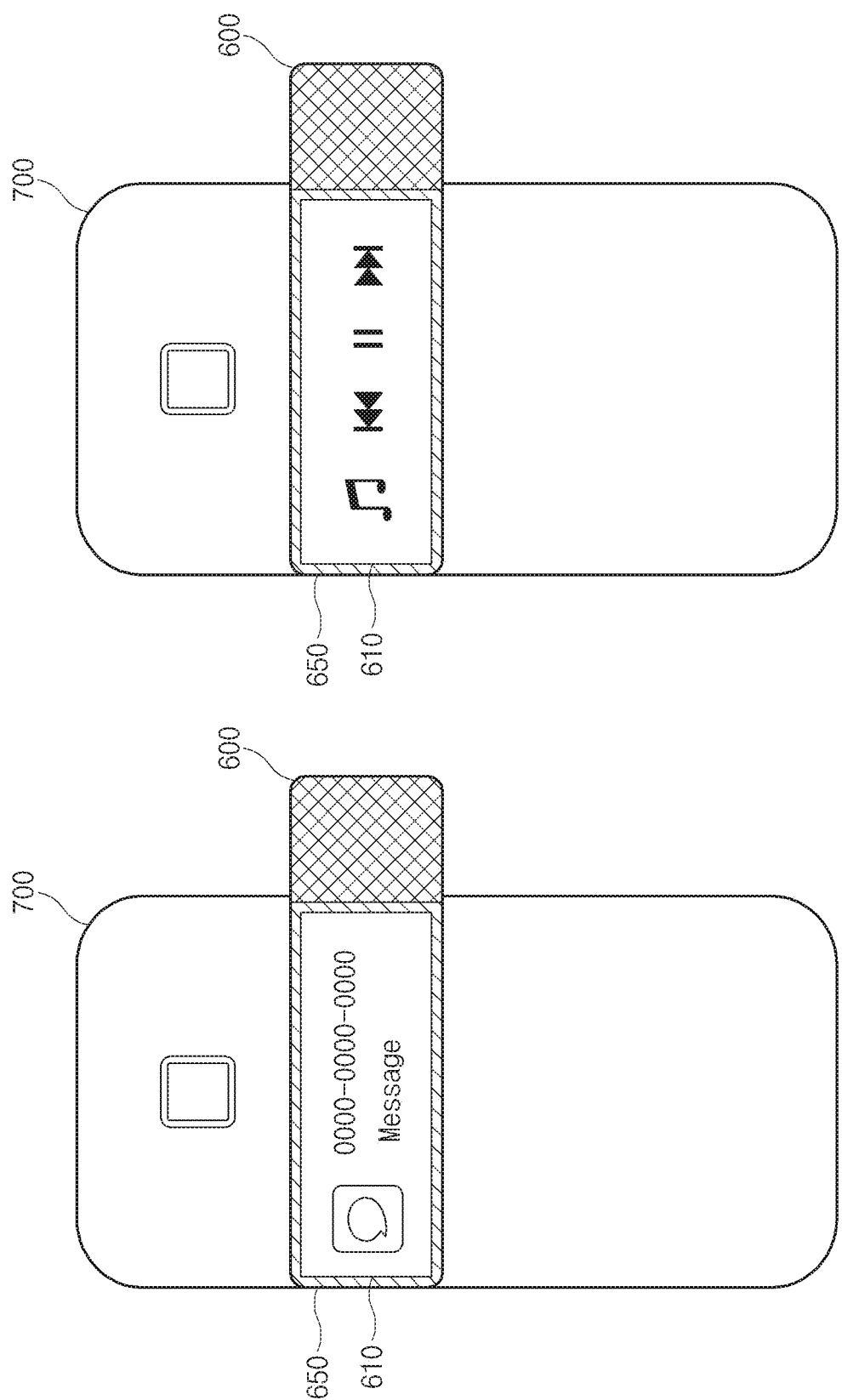
FIG. 14 illustrates an exemplary operation environment of an electronic device operating in conjunction with an external electronic device, according to an embodiment.

Referring to FIG. 14, the electronic device 600 may be in contact with the rear surface of the external electronic device 700. The external electronic device 700 may generate a notification and may receive the notification from other devices. The external electronic device 700 may perform the music playing application.

According to an embodiment, in the case where the transparent area of the external electronic device 700 is in contact with the electronic device 600, the electronic device 600 may display the notification, which is received by the external electronic device 700, in the transparent area.

For example, the electronic device 600 may receive information about the SMS message notification received by the external electronic device 700, from the external electronic device 700. When receiving the SMS message notification, the external electronic device 700 may transmit information about the notification to the electronic device 600. The electronic device 600 may output the notification screen to the transparent area based on the information about the received notification. For example, the electronic device 600 may output a notification screen including information about the icon, sender, and content of the SMS message.

For example, the electronic device 600 may receive information about a music application being executed in the external electronic device 700, from the external electronic device 700. In the case where it is recognized, through the Hall sensor, that the electronic device 600 is in contact with the rear surface of the external electronic device 700, the external electronic device 700 may provide the information about a music playing application to the electronic device 600. The electronic device 600 may output the user interface associated with the music playing application to the transparent area based on the received information. For example, the electronic device 600 may output a user interface capable of performing a function such as play, rewind, fast forward, or the like.

As described above, in the case where the electronic device 600 is placed on the rear surface of the external electronic device 700, the electronic device 600 may provide a notification or a user interface associated with the external electronic device 700 through the electronic device 600; and thus, in the case where the external electronic device 700 is placed such that the rear surface of the external electronic device 700 is exposed, the user may verify the notification or may control the external electronic device 700, through the electronic device 600.

An embodiment is exemplified as in FIG. 14 as a notification or a user interface is provided in the case where the electronic device 600 is in contact with the rear surface of the external electronic device 700. However, embodiments of the present disclosure may not be limited thereto. For example, even though the electronic device 600 is in contact with the front surface of the external electronic device 700, the electronic device 600 may provide the same notification and user interface.

Figure 15:
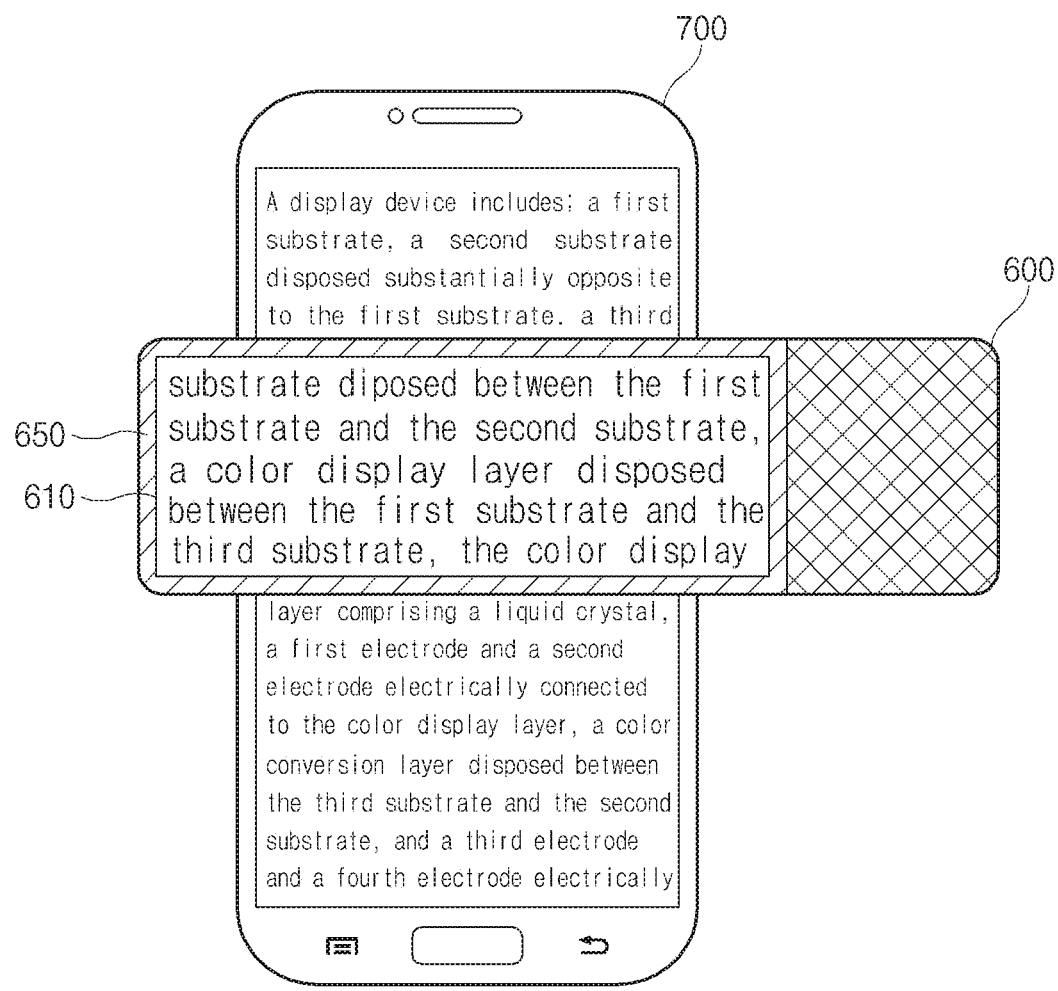
FIG. 15 illustrates an exemplary operation environment of an electronic device operating in conjunction with an external electronic device, according to an embodiment.

Referring to FIG. 15, the display 610 of the electronic device 600 may be spaced apart from the external electronic device 700. The display 610 of the electronic device 600 may be overlapped with the partial area of the display of the external electronic device 700 in the spaced state. The external electronic device 700 may output a text. The display 610 may display a text of an area where the display 610 is overlapped with the external electronic device 700.

According to an embodiment, in the case where the transparent area of the electronic device 600 is spaced apart from the external electronic device 700, the electronic device 600 may perform a function mapped to a distance between the electronic device 600 and the external electronic device 700. According to an embodiment, in the case where the transparent area of the electronic device 600 is spaced apart from the external electronic device 700, the electronic device 600 may enlarge or reduce the screen displayed in the transparent area based on the distance between the electronic device 600 and the external electronic device 700.

For example, even though the electronic device 600 is spaced apart from the external electronic device 700, the electronic device 600 may obtain a text output to an area where the electronic device 600 is overlapped with the external electronic device 700. The electronic device 600 may sense the distance from the external electronic device 700, through the ultrasonic sensor. The electronic device 600 may provide the external electronic device 700 with information about the sensed distance. The external electronic device 700 may calculate an area where the external electronic device 700 is overlapped with the transparent area of the electronic device 600, based on information about the magnitude and direction of the magnetic field sensed by the Hall sensor and information about the distance received from the electronic device 600. The external electronic device 700 may transmit the text output to the overlap area, to the electronic device 600. The electronic device 600 may output the obtained text to the transparent area. The electronic device 600 may enlarge or reduce the size of the text output to the transparent area depending on the distance between the electronic device 600 and the external electronic device 700.

As described above, the user may verify the content displayed on the external electronic device 700 or may control the external electronic device 700 through the electronic device 600 at a distance, by providing various functions depending on the distance from the external electronic device 700 in the case where the electronic device 600 is spaced apart from the external electronic device 700.

Figure 16:
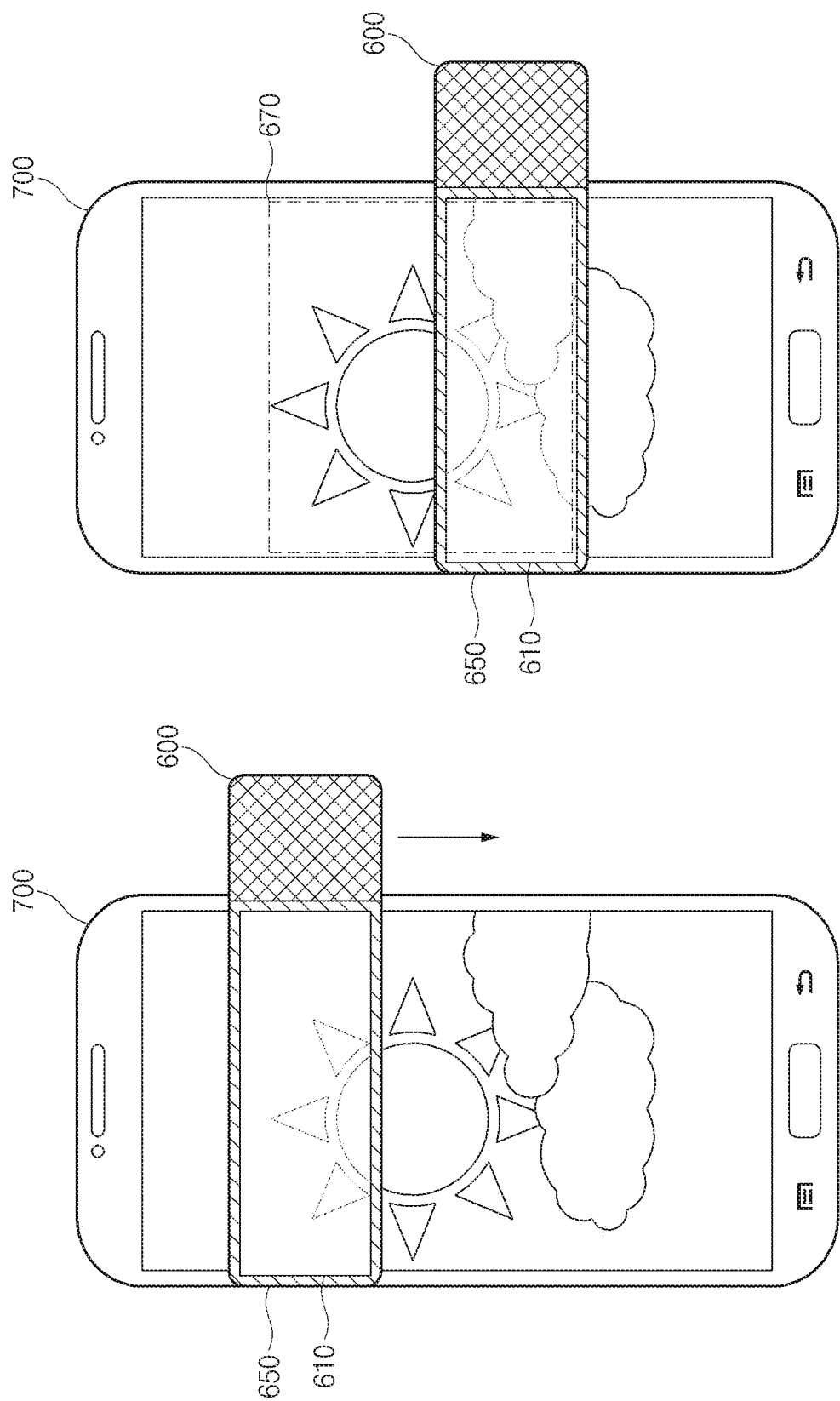
FIG. 16 illustrates an exemplary operation environment of an electronic device operating in conjunction with an external electronic device, according to an embodiment.

Referring to FIG. 16, in a state where the electronic device 600 is in contact with the external electronic device 700, the electronic device 600 may be moved. The external electronic device 700 may output an image through the display. The image output to the external electronic device 700 may be recognized in the transparent area of the electronic device 600 by the user.

According to an embodiment, in the case where the electronic device 600 is moved in a state where the electronic device 600 is in contact with the display of the external electronic device 700, the electronic device 600 may perform a function corresponding to the screen, which is displayed in the area where the transparent area is passing through the display of the external electronic device 700, in the screen output to the display of the external electronic device 700.

For example, the electronic device 600 may be moved onto the external electronic device 700. The electronic device 600 may be moved downwardly. The transparent area of the electronic device 600 may pass through an area 670 by movement. The electronic device 600 may receive information about the image output to the area 670, from the external electronic device 700. The electronic device 600 may store the image output to the area 670. After storing the image output to the area 670, the electronic device 600 may transmit the image to another electronic device.

As described above, a user interface capable of utilizing the transparency and mobility of the electronic device 600 may be provided by performing the function corresponding to the movement path of the electronic device 600.

Figure 17:
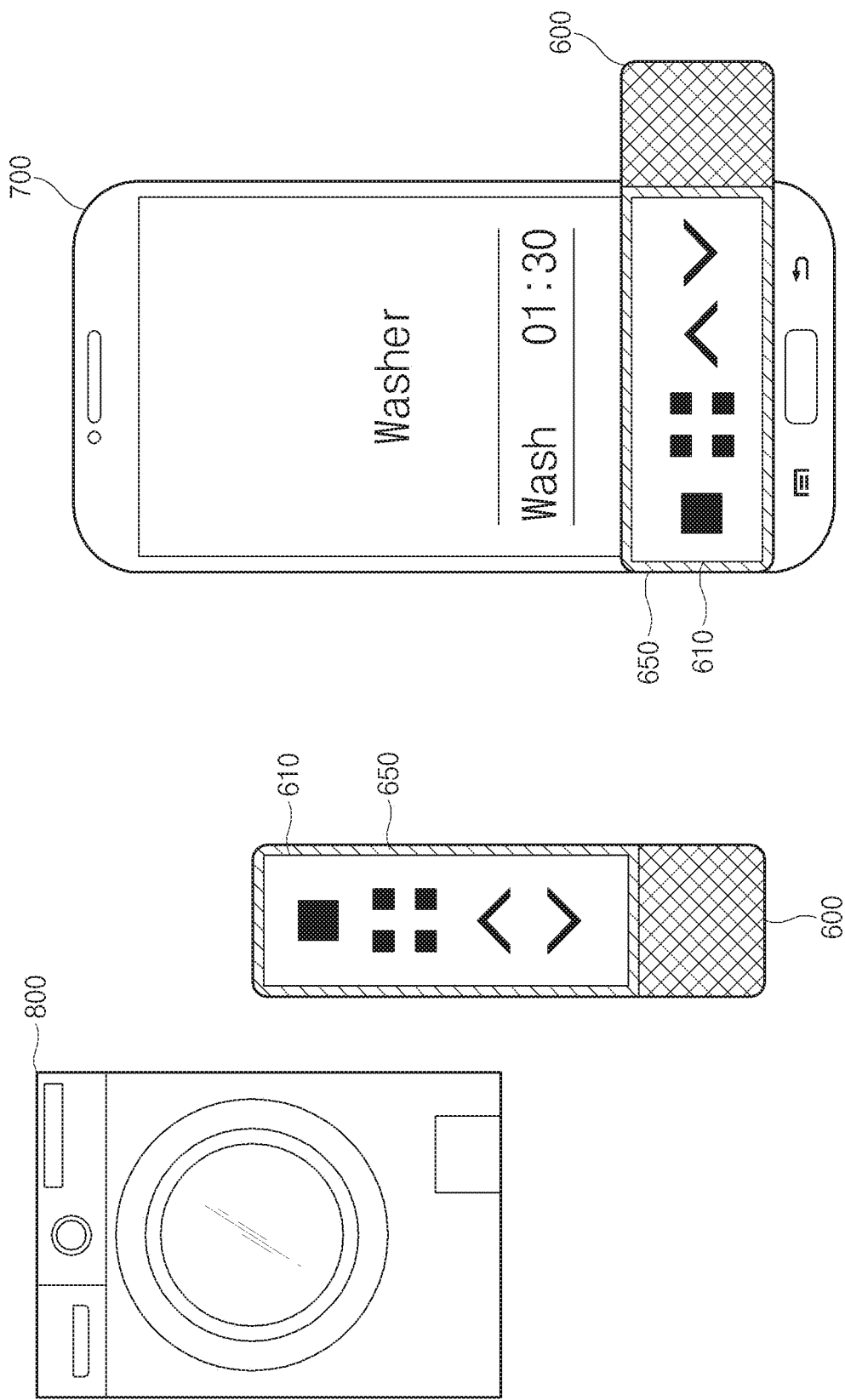
FIG. 17 illustrates an exemplary operation environment of an electronic device operating in conjunction with an external electronic device, according to an embodiment.

Referring to FIG. 17, the electronic device 600 may operate in conjunction with a home appliance 800. When operating in conjunction with a home appliance 800, the electronic device 600 may output a user interface for controlling the home appliance 800, to a transparent area. After operating in conjunction with the home appliance 800, the electronic device 600 may be in contact with the external electronic device 700.

According to an embodiment, in the case where the transparent area is in contact with the external electronic device 700 after the electronic device 600 operates in conjunction with a home appliance 800, the electronic device 600 may provide information about the home appliance 800 to the external electronic device 700 through a communication circuit.

For example, in the case where the electronic device 600 is adjacent to the home appliance 800, the electronic device 600 may receive the information about the home appliance 800 from the home appliance 800 and may output a user interface for controlling the home appliance 800, to the transparent area. In the case where the electronic device 600 is in contact with the external electronic device 700 in a state where the electronic device 600 operates in conjunction with the home appliance 800, the electronic device 600 may provide the external electronic device 700 with the information about the home appliance 800. Even after being in contact with the external electronic device 700, the electronic device 600 may output the user interface for controlling the home appliance 800, to the transparent area. A user interface provided before the electronic device 600 contacts the external electronic device 700 may be different in shape from a user interface provided after the electronic device 600 contacts the external electronic device 700. After receiving the information about the home appliance 800, the external electronic device 700 may perform an application associated with the home appliance 800. The external electronic device 700 may output information such as the type, operating state, operating time, and the like of the home appliance 800.

As described above, a user interface capable of improving the utilization of Internet of Things (IoT) may be provided by executing the function associated with the home appliance 800.

Figure 18:
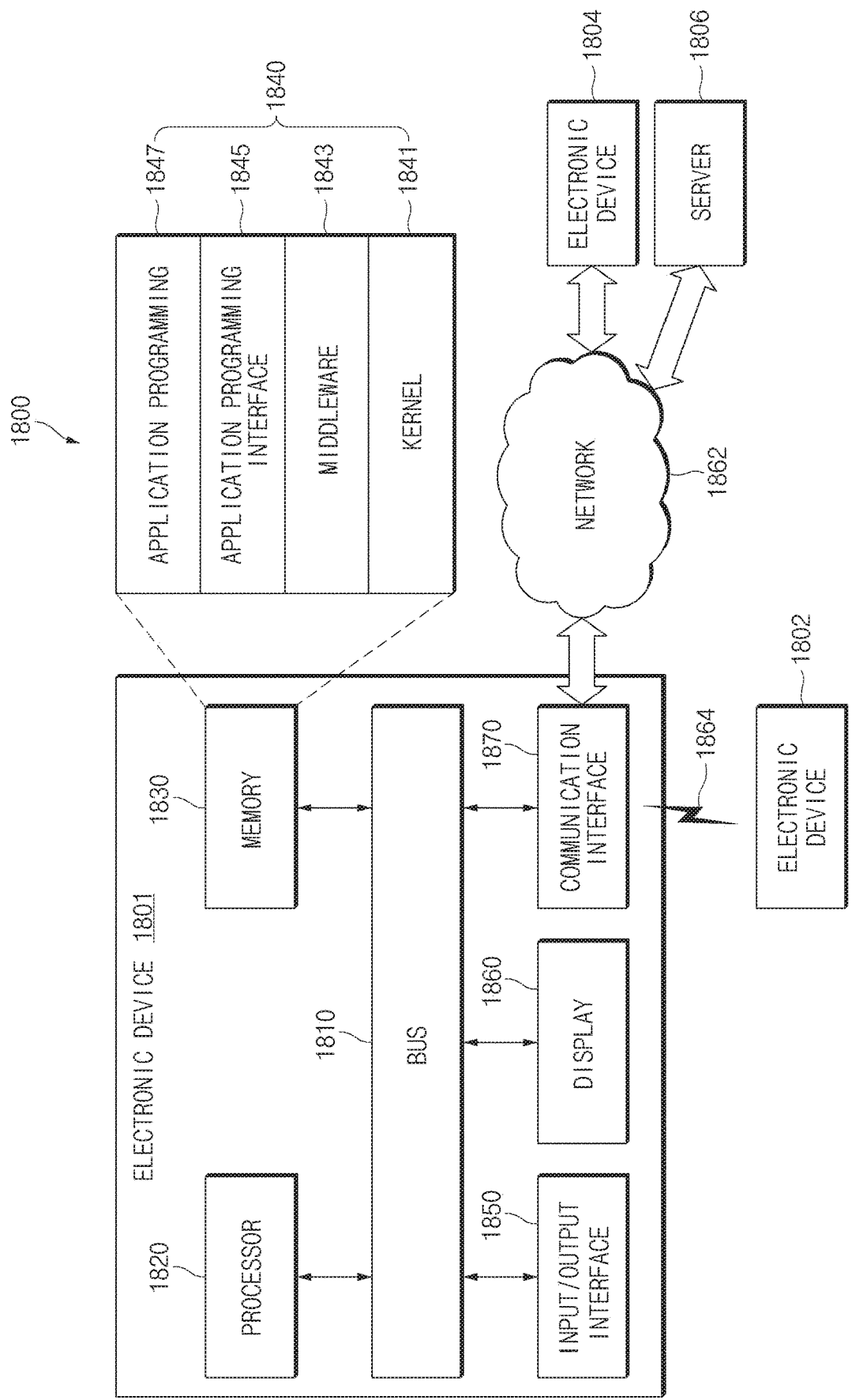
FIG. 18 illustrates an electronic device in a network environment, according to various embodiments.

FIG. 18 illustrates an electronic device in a network environment system, according to various embodiments.

Referring to FIG. 18, according to various embodiments, an electronic device 1801, 1802, or 1804, or a server 1806 may be connected each other over a network 1862 or a short range communication 1864. The electronic device 1801 may include a bus 1810, a processor 1820, a memory 1830, an input/output interface 1850, a display 1860, and a communication interface 1870. According to an embodiment, the electronic device 1801 may not include at least one of the above-described elements or may further include other element(s).

For example, the bus 1810 may interconnect the above-described elements 1820 to 1870 and may include a circuit for conveying communications (e.g., a control message and/or data) among the above-described elements.

The processor 1820 may include one or more of a central processing unit (CPU), an application processor (AP), or a communication processor (CP). For example, the processor 1820 may perform an arithmetic operation or data processing associated with control and/or communication of at least other elements of the electronic device 1801.

The memory 1830 may include a volatile and/or nonvolatile memory. For example, the memory 1830 may store instructions or data associated with at least one other element(s) of the electronic device 1801. According to an embodiment, the memory 1830 may store software and/or a program 1840. The program 1840 may include, for example, a kernel 1841, a middleware 1843, an application programming interface (API) 1845, and/or an application program (or "an application") 1847. At least a part of the kernel 1841, the middleware 1843, or the API 1845 may be referred to as an "operating system (OS)".

For example, the kernel 1841 may control or manage system resources (e.g., the bus 1810, the processor 1820, the memory 1830, and the like) that are used to execute operations or functions of other programs (e.g., the middleware 1843, the API 1845, and the application program 1847). Furthermore, the kernel 1841 may provide an interface that allows the middleware 1843, the API 1845, or the application program 1847 to access discrete elements of the electronic device 1801 so as to control or manage system resources.

The middleware 1843 may perform, for example, a mediation role such that the API 1845 or the application program 1847 communicates with the kernel 1841 to exchange data.

Furthermore, the middleware 1843 may process task requests received from the application program 1847 according to a priority. For example, the middleware 1843 may assign the priority, which makes it possible to use a system resource (e.g., the bus 1810, the processor 1820, the memory 1830, or the like) of the electronic device 1801, to at least one of the application program 1847. For example, the middleware 1843 may process the one or more task requests according to the priority assigned to the at least one, which makes it possible to perform scheduling or load balancing on the one or more task requests.

The API 1845 may be, for example, an interface through which the application program 1847 controls a function provided by the kernel 1841 or the middleware 1843, and may include, for example, at least one interface or function (e.g., an instruction) for a file control, a window control, image processing, a character control, or the like.

The input/output interface 1850 may play a role, for example, of an interface which transmits an instruction or data input from a user or another external device, to other element(s) of the electronic device 1801. Furthermore, the input/output interface 1850 may output an instruction or data, received from other element(s) of the electronic device 1801, to a user or another external device.

The display 1860 may include, for example, a liquid crystal display (LCD), a light-emitting diode (LED) display, an organic LED (OLED) display, a microelectromechanical systems (MEMS) display, or an electronic paper display. The display 1860 may display, for example, various contents (e.g., a text, an image, a video, an icon, a symbol, and the like) to a user. The display 1860 may include a touch screen and may receive, for example, a touch, gesture, proximity, or hovering input using an electronic pen or a part of a user's body.

For example, the communication interface 1870 may establish communication between the electronic device 1801 and an external device (e.g., the first external electronic device 1802, the second external electronic device 1804, or the server 1806). For example, the communication interface 1870 may be connected to the network 1862 over wireless communication or wired communication to communicate with the external device (e.g., the second electronic device 1804 or the server 1806).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1864. The short range communication 1864 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1801 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1862 may include at least one of telecommunications networks, for example, a computer network (e.g., LAN or WAN), an Internet, or a telephone network.

Each of the first and second external electronic devices 1802 and 1804 may be a device of which the type is different from or the same as that of the electronic device 1801. According to an embodiment, the server 1806 may include a group of one or more servers. According to various embodiments, all or a portion of operations that the electronic device 1801 will perform may be executed by another or plural electronic devices (e.g., the electronic device 1802 or 1804, and the server 1806). According to an embodiment, in the case where the electronic device 1801 executes any function or service automatically or in response to a request, the electronic device 1801 may not perform the function or the service internally, but, alternatively additionally, it may request at least a portion of a function associated with the electronic device 1801 from another device (e.g., the electronic device 1802 or 1804 or the server 1806). The other electronic device (e.g., the electronic device 1802 or 1804 or the server 1806) may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

Figure 19:
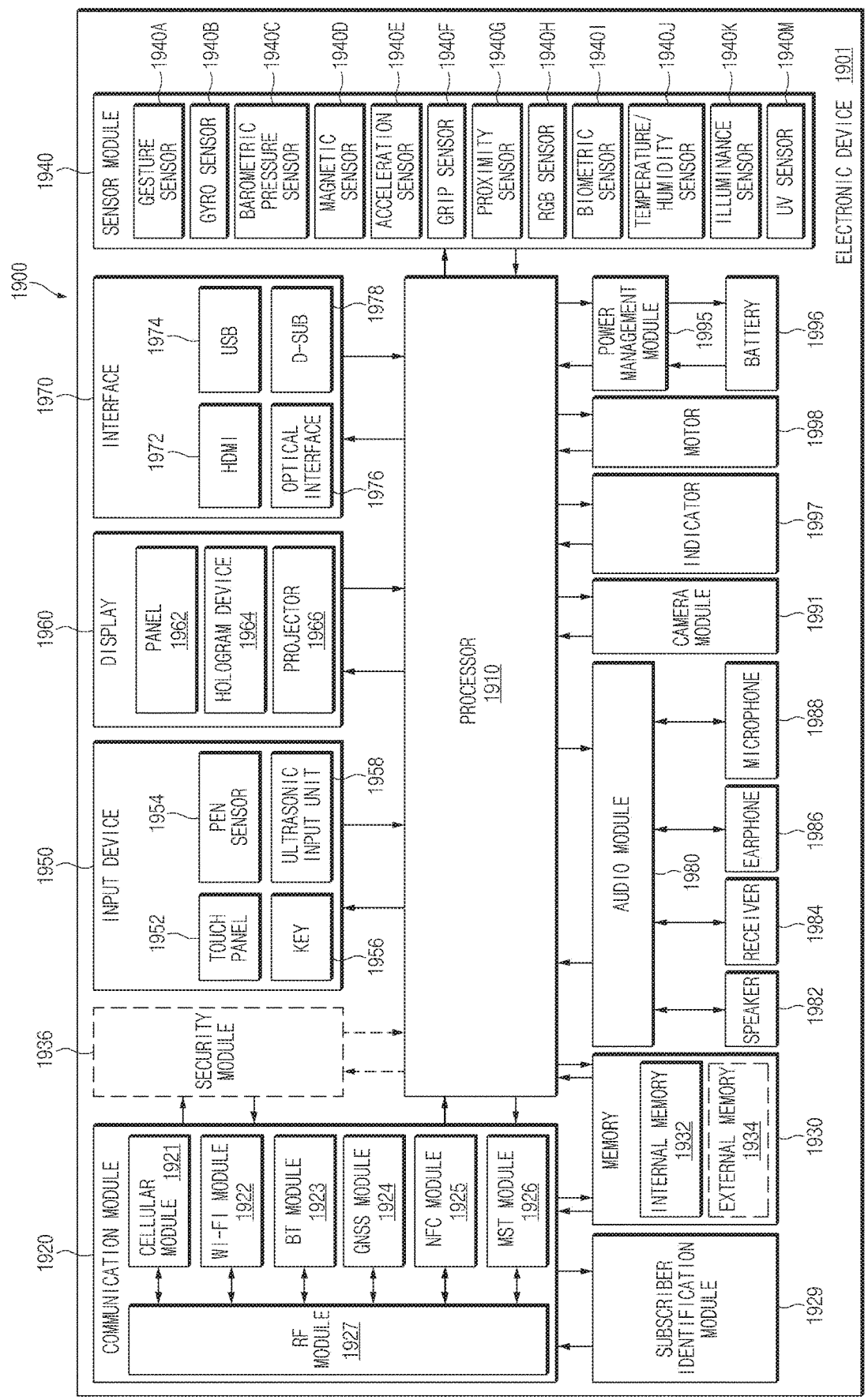
FIG. 19 illustrates a block diagram of an electronic device according to various embodiments.

FIG. 19 illustrates a block diagram of an electronic device 1901, according to various embodiments.

Referring to FIG. 19, an electronic device 1901 may include, for example, all or a part of the electronic device 1801 illustrated in FIG. 18. The electronic device 1901 may include one or more processors (e.g., an application processor (AP)) 1910, a communication module 1920, a subscriber identification module 1929, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may drive, for example, an operating system (OS) or an application to control a plurality of hardware or software elements connected to the processor 1910 and may process and compute a variety of data. For example, the processor 1910 may be implemented with a System on Chip (SoC). According to an embodiment, the processor 1910 may further include a graphic processing unit (GPU) and/or an image signal processor. The processor 1910 may include at least a part (e.g., a cellular module 1921) of elements illustrated in FIG. 19. The processor 1910 may load a command or data, which is received from at least one of other elements (e.g., a nonvolatile memory), into a volatile memory and process the loaded command or data. The processor 1910 may store a variety of data in the nonvolatile memory.

The communication module 1920 may be configured the same as or similar to the communication interface 1870 of FIG. 18. The communication module 1920 may include the cellular module 1921, a Wi-Fi module 1922, a Bluetooth (BT) module 1923, a GNSS module 1924 (e.g., a GPS module, a Glonass module, a Beidou module, or a Galileo module), a near field communication (NFC) module 1925, a MST module 1926 and a radio frequency (RF) module 1927.

The cellular module 1921 may provide, for example, voice communication, video communication, a character service, an Internet service, or the like over a communication network. According to an embodiment, the cellular module 1921 may perform discrimination and authentication of the electronic device 1901 within a communication network by using the subscriber identification module (e.g., a SIM card) 1929. According to an embodiment, the cellular module 1921 may perform at least a portion of functions that the processor 1910 provides. According to an embodiment, the cellular module 1921 may include a communication processor (CP).

Each of the Wi-Fi module 1922, the BT module 1923, the GNSS module 1924, the NFC module 1925, or the MST module 1926 may include a processor for processing data exchanged through a corresponding module, for example. According to an embodiment, at least a part (e.g., two or more) of the cellular module 1921, the Wi-Fi module 1922, the BT module 1923, the GNSS module 1924, the NFC module 1925, or the MST module 1926 may be included within one Integrated Circuit (IC) or an IC package.

For example, the RF module 1927 may transmit and receive a communication signal (e.g., an RF signal). For example, the RF module 1927 may include a transceiver, a power amplifier module (PAM), a frequency filter, a low noise amplifier (LNA), an antenna, or the like. According to another embodiment, at least one of the cellular module 1921, the Wi-Fi module 1922, the BT module 1923, the GNSS module 1924, the NFC module 1925, or the MST module 1926 may transmit and receive an RF signal through a separate RF module.

The subscriber identification module 1929 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1930 (e.g., the memory 1830) may include an internal memory 1932 or an external memory 1934. For example, the internal memory 1932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1934 may be operatively and/or physically connected to the electronic device 1901 through various interfaces.

A security module 1936 may be a module that includes a storage space of which a security level is higher than that of the memory 1930 and may be a circuit that guarantees safe data storage and a protected execution environment. The security module 1936 may be implemented with a separate circuit and may include a separate processor. For example, the security module 1936 may be in a smart chip or a secure digital (SD) card, which is removable, or may include an embedded secure element (eSE) embedded in a fixed chip of the electronic device 1901. Furthermore, the security module 1936 may operate based on an operating system (OS) that is different from the OS of the electronic device 1901. For example, the security module 1936 may operate based on java card open platform (JCOP) OS.

The sensor module 1940 may measure, for example, a physical quantity or may detect an operation state of the electronic device 1901. The sensor module 1940 may convert the measured or detected information to an electric signal. For example, the sensor module 1940 may include at least one of a gesture sensor 1940A, a gyro sensor 1940B, a barometric pressure sensor 1940C, a magnetic sensor 1940D, an acceleration sensor 1940E, a grip sensor 1940F, the proximity sensor 1940G, a color sensor 1940H (e.g., red, green, blue (RGB) sensor), a biometric sensor 1940I, a temperature/humidity sensor 1940J, an illuminance sensor 1940K, or an UV sensor 1940M. Although not illustrated, additionally or generally, the sensor module 1940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling at least one or more sensors included therein. According to an embodiment, the electronic device 1901 may further include a processor that is a part of the processor 1910 or independent of the processor 1910 and is configured to control the sensor module 1940. The processor may control the sensor module 1940 while the processor 1910 remains at a sleep state.

The input device 1950 may include, for example, a touch panel 1952, a (digital) pen sensor 1954, a key 1956, or an ultrasonic input unit 1958. For example, the touch panel 1952 may use at least one of capacitive, resistive, infrared and ultrasonic detecting methods. Also, the touch panel 1952 may further include a control circuit. The touch panel 1952 may further include a tactile layer to provide a tactile reaction to a user.

The (digital) pen sensor 1954 may be, for example, a part of a touch panel or may include an additional sheet for recognition. The key 1956 may include, for example, a physical button, an optical key, a keypad, or the like. The ultrasonic input device 1958 may detect (or sense) an ultrasonic signal, which is generated from an input device, through a microphone (e.g., a microphone 1988) and may check data corresponding to the detected ultrasonic signal.

The display 1960 (e.g., the display 1860) may include a panel 1962, a hologram device 1964, or a projector 1966. The panel 1962 may be the same as or similar to the display 1860 illustrated in FIG. 18. The panel 1962 may be implemented, for example, to be flexible, transparent or wearable. The panel 1962 and the touch panel 1952 may be integrated into a single module. The hologram device 1964 may display a stereoscopic image in a space using a light interference phenomenon. The projector 1966 may project light onto a screen so as to display an image. For example, the screen may be arranged in the inside or the outside of the electronic device 1901. According to an embodiment, the display 1960 may further include a control circuit for controlling the panel 1962, the hologram device 1964, or the projector 1966.

The interface 1970 may include, for example, a high-definition multimedia interface (HDMI) 1972, a universal serial bus (USB) 1974, an optical interface 1976, or a D-subminiature (D-sub) 1978. The interface 1970 may be included, for example, in the communication interface 1870 illustrated in FIG. 18. Additionally or generally, the interface 1970 may include, for example, a mobile high definition link (MHL) interface, a SD card/multi-media card (MMC) interface, or an infrared data association (IrDA) standard interface.

The audio module 1980 may convert a sound and an electric signal in dual directions. At least a part of the audio module 1980 may be included, for example, in the input/output interface 1850 illustrated in FIG. 18. The audio module 1980 may process, for example, sound information that is input or output through a speaker 1982, a receiver 1984, an earphone 1986, or the microphone 1988.

For example, the camera module 1991 may shoot a still image or a video. According to an embodiment, the camera module 1991 may include at least one or more image sensors (e.g., a front sensor or a rear sensor), a lens, an image signal processor (ISP), or a flash (e.g., an LED or a xenon lamp).

The power management module 1995 may manage, for example, power of the electronic device 1901. According to an embodiment, a power management integrated circuit (PMIC), a charger IC, or a battery or fuel gauge may be included in the power management module 1995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1996 and a voltage, current or temperature thereof while the battery is charged. The battery 1996 may include, for example, a rechargeable battery and/or a solar battery.

The indicator 1997 may display a specific state of the electronic device 1901 or a part thereof (e.g., the processor 1910), such as a booting state, a message state, a charging state, and the like. The motor 1998 may convert an electrical signal into a mechanical vibration and may generate the following effects: vibration, haptic, and the like. Although not illustrated, a processing device (e.g., a GPU) for supporting a mobile TV may be included in the electronic device 1901. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 20:
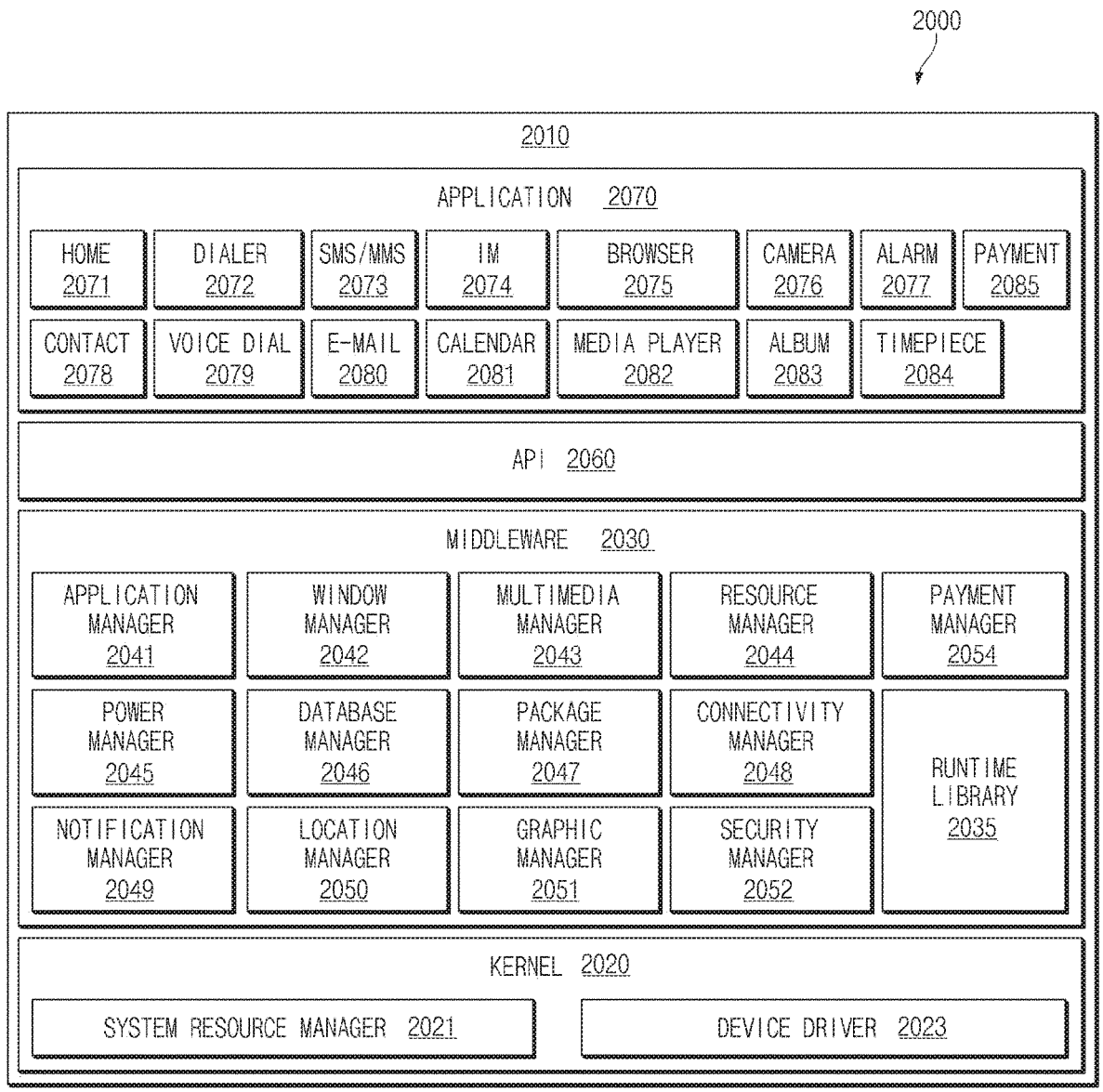
FIG. 20 illustrates a block diagram of a program module, according to various embodiments.

FIG. 20 illustrates a block diagram of a program module, according to various embodiments.

According to an embodiment, a program module 2010 (e.g., the program 1840) may include an operating system (OS) to control resources associated with an electronic device (e.g., the electronic device 1801), and/or diverse applications (e.g., the application program 1847) driven on the OS. The OS may be, for example, Android, iOS, Windows, Symbian, Tizen, or bada.

The program module 2010 may include a kernel 2020, a middleware 2030, an application programming interface (API) 2060, and/or an application 2070. At least a portion of the program module 2010 may be preloaded on an electronic device or may be downloadable from an external electronic device (e.g., the electronic device 1802 or 1804, the server 1806, or the like).

The kernel 2020 (e.g., the kernel 1841) may include, for example, a system resource manager 2021 or a device driver 2023. The system resource manager 2021 may perform control, allocation, or retrieval of system resources. According to an embodiment, the system resource manager 2021 may include a process managing unit, a memory managing unit, or a file system managing unit. The device driver 2023 may include, for example, a display driver, a camera driver, a Bluetooth driver, a shared memory driver, a USB driver, a keypad driver, a Wi-Fi driver, an audio driver, or an inter-process communication (IPC) driver.

The middleware 2030 may provide, for example, a function that the application 2070 needs in common, or may provide diverse functions to the application 2070 through the API 2060 to allow the application 2070 to efficiently use limited system resources of the electronic device. According to an embodiment, the middleware 2030 (e.g., the middleware 1843) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, a security manager 2052, or a payment manager 2054.

The runtime library 2035 may include, for example, a library module that is used by a compiler to add a new function through a programming language while the application 2070 is being executed. The runtime library 2035 may perform input/output management, memory management, or capacities about arithmetic functions.

The application manager 2041 may manage, for example, a life cycle of at least one application of the application 2070. The window manager 2042 may manage a graphic user interface (GUI) resource that is used in a screen. The multimedia manager 2043 may identify a format necessary for playing diverse media files, and may perform encoding or decoding of media files by using a codec suitable for the format. The resource manager 2044 may manage resources such as a storage space, memory, or source code of at least one application of the application 2070.

The power manager 2045 may operate, for example, with a basic input/output system (BIOS) to manage a battery or power, and may provide power information for an operation of an electronic device. The database manager 2046 may generate, search for, or modify database that is to be used in at least one application of the application 2070. The package manager 2047 may install or update an application that is distributed in the form of package file.

The connectivity manager 2048 may manage, for example, wireless connection such as Wi-Fi or Bluetooth. The notification manager 2049 may display or notify an event such as arrival message, appointment, or proximity notification in a mode that does not disturb a user. The location manager 2050 may manage location information about an electronic device. The graphic manager 2051 may manage a graphic effect that is provided to a user, or manage a user interface relevant thereto. The security manager 2052 may provide a general security function necessary for system security, user authentication, or the like. According to an embodiment, in the case where an electronic device (e.g., the electronic device 1801) includes a telephony function, the middleware 2030 may further include a telephony manager for managing a voice or video call function of the electronic device.

The middleware 2030 may include a middleware module that combines diverse functions of the above-described elements. The middleware 2030 may provide a module specialized to each OS kind to provide differentiated functions. Additionally, the middleware 2030 may dynamically remove a part of the preexisting elements or may add new elements thereto.

The API 2060 (e.g., the API 1845) may be, for example, a set of programming functions and may be provided with a configuration that is variable depending on an OS. For example, in the case where an OS is Android or iOS, it may provide one API set per platform. In the case where an OS is Tizen, it may provide two or more API sets per platform.

The application 2070 (e.g., the application program 1847) may include, for example, one or more applications capable of providing functions for a home 2071, a dialer 2072, an SMS/MMS 2073, an instant message (IM) 2074, a browser 2075, a camera 2076, an alarm 2077, a contact 2078, a voice dial 2079, an e-mail 2080, a calendar 2081, a media player 2082, an album 2083, and a timepiece 2084 or for offering health care (e.g., measuring an exercise quantity, blood sugar, or the like) or environment information (e.g., information of barometric pressure, humidity, temperature, or the like).

According to an embodiment, the application 2070 may include an application (hereinafter referred to as "information exchanging application" for descriptive convenience) to support information exchange between an electronic device (e.g., the electronic device 1801) and an external electronic device (e.g., the electronic device 1802 or 1804). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1802 or 1804). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1802 or 1804) which communicates with the electronic device, an application running in the external electronic device, or a service (e.g., a call service, a message service, or the like) provided from the external electronic device.

According to an embodiment, the application 2070 may include an application (e.g., a health care application of a mobile medical device) that is assigned in accordance with an attribute of an external electronic device (e.g., the electronic device 1802 or 1804). According to an embodiment, the application 2070 may include an application that is received from an external electronic device (e.g., the server 1806 or the electronic device 1802 or 1804). According to an embodiment, the application 2070 may include a preloaded application or a third party application that is downloadable from a server. The names of elements of the program module 2010 according to the embodiment may be modifiable depending on kinds of operating systems.

According to various embodiments, at least a portion of the program module 2010 may be implemented by software, firmware, hardware, or a combination of two or more thereof. At least a portion of the program module 2010 may be implemented (e.g., executed), for example, by the processor (e.g., the processor 1910). At least a portion of the program module 2010 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1820), may cause the one or more processors to perform a function corresponding to the instruction. The computer-readable storage media, for example, may be the memory 1830.

A computer-readable recording medium may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device movable along a strap of an external device comprising:
    a display including a transparent area through which content is output and through which external light passes;
    a communication circuit configured to transmit or receive data to or from the external device;
    a housing configured to accommodate the strap of the external device;
    a Hall sensor configured to sense a magnetic field generated by a plurality of magnets included in the strap; and
    a processor electrically connected to the display,
    wherein the processor is configured to:
        obtain information about an overlap location of the external device and the electronic device using the Hall sensor,
        execute a function mapped to the information about the overlap location, and
        output a screen associated with the function on the transparent area wherein the processor is further configured to:
        when the information about the overlap location is changed, obtain information about a function being executed in the external device from the external device, through the communication circuit and
        output a screen associated with the function, which is being executed in the external device, on the transparent area.

2. The electronic device of claim 1, wherein the processor is further configured to:
    when the information about the overlap location is changed, activate the transparent area, and
    output a home screen on the transparent area.

3. The electronic device of claim 1, wherein the processor is further configured to:
    when the electronic device is moved onto a specified location of the strap, execute a function mapped to the specified location.

4. The electronic device of claim 1, wherein the processor is further configured to:
    obtain color information of the strap, and
    change a color of the output screen on the transparent area, based on the color information.

5. The electronic device of claim 1, wherein the processor is further configured to:
    obtain information about a type of the strap, and
    execute a function mapped to the information about the type of the strap.

6. The electronic device of claim 1,
    wherein the external device including a Hall sensor sensing a magnetic field,
    wherein the electronic device further comprises:
        a magnet generating the magnetic field, and
    wherein the processor is further configured to:
        obtain information about the overlap location of the external device and the electronic device, from the external device through the communication circuit.

7. The electronic device of claim 6, wherein the processor is further configured to:
    when the transparent area is in contact with a display of the external device, execute a function corresponding to a screen, which is output to an area where the transparent area is overlapped with the display of the external device, in a screen output to the display of the external device.

8. The electronic device of claim 6, wherein the processor is further configured to:
    when an application of the external device is selected through the transparent area after the transparent area is in contact with a display of the external device, output an execution screen of the application on the transparent area.

9. The electronic device of claim 6, wherein the processor is further configured to:
    when the transparent area is in contact with a front surface or a rear surface of the external device, output a user interface associated with an application, which is being executed in the external device, on the transparent area.

10. The electronic device of claim 6, wherein the processor is further configured to:
    when the transparent area is in contact with a front surface or a rear surface of the external device, output a notification, which is received by the external device, on the transparent area.

11. The electronic device of claim 6, further comprising:
    an ultrasonic sensor configured to sense a distance between the electronic device and the external device,
    wherein the processor is further configured to:
        when the transparent area is spaced apart from the external device, execute a function mapped to the distance between the electronic device and the external device.

12. The electronic device of claim 6, wherein the external electronic device may recognize the function mapped to the overlap location, based on the information about the overlap location of the electronic device sensed by the Hall sensor.

13. A screen providing method according to a location of an electronic device movable along a strap of an external device, the method comprising:
    obtaining information about an overlap location of an external device and the electronic device using the Hall sensor;
    executing a function mapped to the information about the overlap location;

outputting a screen associated with the function on a transparent area of the display;

when the information about the overlap location is changed, obtaining information about a function being executed in the external device from the external device; and outputting a screen associated with the function, which is being executed in the external device, on the transparent area.

14. A non-transitory computer-readable recording medium storing an instruction that, when executed by at least one processor included in an electronic device movable along a strap of an external device, causes the processor to:

obtain information about an overlap location of the external device and the electronic device using a Hall sensor included in the electronic device;

execute a function mapped to the information about the overlap location;

output a screen associated with the function on a transparent area of a display included in the electronic device;

when the information about the overlap location is changed, obtain information about a function being executed in the external device from the external device, through a communication circuit included in the electronic device; and output a screen associated with the function, which is being executed in the external device, on the transparent area.

* * * * *